United States Patent
Starr et al.

(10) Patent No.: US 7,120,122 B1
(45) Date of Patent: *Oct. 10, 2006

(54) SYSTEM AND METHOD FOR DIAGNOSTIC SUPERVISION OF INTERNET TRANSMISSIONS WITH QUALITY OF SERVICE CONTROL

(75) Inventors: Michael A. Starr, Charlottesville, VA (US); Charles J. Gross, Earlysville, VA (US)

(73) Assignee: Comdial Corporation, Charlottesville, VA (US)

( * ) Notice: Subject to any disclaimer, the term of this patent is extended or adjusted under 35 U.S.C. 154(b) by 690 days.

This patent is subject to a terminal disclaimer.

(21) Appl. No.: 09/658,330

(22) Filed: Sep. 8, 2000

Related U.S. Application Data

(63) Continuation-in-part of application No. 09/393,659, filed on Sep. 10, 1999, now Pat. No. 6,553,515.

(51) Int. Cl.
*H04L 12/26* (2006.01)
*H04L 12/56* (2006.01)

(52) U.S. Cl. .................. 370/250; 370/252; 370/395.21

(58) Field of Classification Search ................ 370/352, 370/389, 395.21, 400, 912, 241–244, 248, 370/250, 251–252; 379/900
See application file for complete search history.

(56) References Cited

U.S. PATENT DOCUMENTS

| | | | | |
|---|---|---|---|---|
| 5,408,465 A | * | 4/1995 | Gusella et al. | 370/231 |
| 5,461,611 A | * | 10/1995 | Drake et al. | 370/420 |
| 5,774,656 A | * | 6/1998 | Hattori et al. | 709/223 |
| 5,903,558 A | * | 5/1999 | Jones et al. | 370/351 |
| 6,553,515 B1 | * | 4/2003 | Gross et al. | 714/47 |
| 6,628,610 B1 | * | 9/2003 | Waclawsky et al. | 370/229 |

* cited by examiner

*Primary Examiner*—Chi Pham
*Assistant Examiner*—Tri H. Phan
(74) *Attorney, Agent, or Firm*—Holland & Knight LLP

(57) ABSTRACT

A system and method are provided for managing diagnostic and performance information for communications system terminal endpoints (TEs) communicating over an Internet Protocol (IP) network. The TEs communicate by transmissions that are voice, modem, facsimile, video, data transmissions, or the like. A Diagnostic Supervisor (DS) transmits Diagnostic Configuration Messages (DCMs) to the TEs. The TEs generate Diagnostic Messages (DMs) based on diagnostic information, including error statistics, voice statistics, facsimile statistics, video statistics, data statistics, or the like, concerning IP network transmissions in which the TEs participate. The DCMs instructs the TEs how to format and when to transmit DMs. The DMs are transmitted by the TEs to the DS. In a system with more than one DS, the TEs can transmit DMS to the plural DSs, other TEs or any network devices.

12 Claims, 21 Drawing Sheets

SYSTEM AND METHOD FOR DIAGNOSTIC SUPERVISION OF INTERNET TRANSMISSIONS WITH QUALITY OF SERVICE CONTROL

This application is a Continuation-in-part Application of U.S. patent application Ser. No. 09/393,659, filed on Sep. 10, 1999 now U.S. Pat. No. 6,553,515, which is incorporated herein by reference in its entirety.

BACKGROUND OF THE INVENTION

1. Field of the Invention

This invention generally relates to communications, and more specifically to a system and method for diagnostics supervision of Internet transmissions, such as VoIP calls.

2. Related Art

The uses of the public Internet are very diverse. A use that has recently gained much attention is Voice-over-Internet Protocol (VoIP) technology, which involves using the public Internet or a private IP network to carry voice calls, either partially or completely bypassing the public switched telephone network (PSTN).

VoIP, as well as video conferencing, has been used by computer hobbyists to place no-charge, and typically low-quality, calls over the Internet, using microphones, video cameras, and speakers connected to a personal computer (PC) audio card supported by audio/video software. Commercial applications of VoIP technology are now emerging. Various types of services can be provided using VoIP, including enterprise toll bypass, IP-based IntereXchange Carrier (IXC; long distance) service, and IP-based local telephony.

As is well known in the art, data sent across the Internet is broken up into packets. This break down of information into packets is a result of a variety of reasons, including hardware limitations, for example. As is known in the art, each packet is provided with a header, for example. The header contains a variety of information, including the order in which related packets should be assembled at a receiving end. Additionally, as the packets are created, information may be added to the header to test for errors introduced into the packet during transmission. This information added to the header may designate the amount of data in the packet, for example.

Each respective packet is placed into a separate "envelope." The envelope contains address information, which tells the Internet where to send the data. Each of the envelopes for a single piece of data possess the same address information. As a result, each envelope is sent to the same destination to be reassembled. Each of the envelopes contain headers. The headers possess information including the sender address, the receiving address, and the period of time the package should be maintained before discarding, for example.

As the packets travel across the Internet, routers positioned along the way examine the envelopes to determine their addresses. As each of the packets encounter a router, the router determines the most efficient path for sending each packet to the next router, which is closest to the final destination of the packet. Accordingly, after traveling through a series of routers, the packets arrive at their final destination. It should be appreciated that the traffic load on the Internet changes constantly. As a result, related packets forming a package may well be sent along different routes, with different delays.

As the packets arrive at their destination, information for each packet is calculated according to a specific protocol. This calculated information is then compared with information in the header of the received packet. In this manner, it may be determined whether data in the packet has been corrupted during transmission. If information has been corrupted, the packet may be discarded and/or a request generated for retransmission of the original packet.

Eventually, most of the packets are received by a computer, for example, at the destination. Once the packets are received, the packets may be reassembled into their original, unified form using a suitable protocol.

Communications over the Internet utilize three main protocols. These three protocols operate in conjunction with each other to break the data into packets on a sending end, route the packets across the Internet, and then combine the packets on a receiving end. Specifically, the Internet protocol (IP) controls the route of the data. In contrast, the transmission control protocol (TCP) and User datagram protocol (UDP) breaks the data into packets and recombines the packets on the computer that receives the information. Collectively, the IP, TCP and UDP protocols are the TCP/IP protocol.

In further explanation of the nature of the TCP/IP protocol, it should be appreciated that the Internet may be characterized as a packet-switched network. In a packet-switched network, there is not a single, unbroken connection between a sender and a receiver. Rather, when information is sent over the Internet, the information is broken into packets. These packets may be sent over many different routes at the same time. The packets are then collected and reassembled at a receiving end. In contrast, the telephone system may be characterized as a circuit-switched network. In a circuit-switched network, as with a common telephone call, an actual connection is established. That is, after a connection is made, that part of the network supporting the call is dedicated only to that single connection.

The TCP/IP protocol may be characterized as containing a suite of protocols. The UDP is part of the TCP/IP suite of protocols. The UDP may be utilized to conserve bandwidth. However, UDP does not provide for error detection/correction or any other quality of service (QoS) within the existing protocol. Thus, the quality and transmission of calls is uncertain when using UDP.

Bandwidth as used herein may be characterized as the amount of data that can be transmitted over a given communications path. The bandwidth in a digital transmission may be measured in bits per second (bps), for example.

In further explanation, packets utilizing UDP protocol have less overhead, i.e., computer resource requirements, because the packets do not have bits with packet numbers and acknowledgements. As a result, UDP is considered a connectionless protocol because packets arrive at the destination independently from various routes. Further, the packets arrive without sequence numbers. As a result, the UDP protocol does not provide a guarantee that all of the packets for a particular message arrive. This aspect of UDP makes UDP an unreliable transport mechanism.

What is needed is a technique to better control Internet transmissions, such as VoIP calls, by providing real-time information about the quality of inbound and outbound voice, modem, facsimile, video streams, and other multimedia transmissions, for example.

SUMMARY OF THE INVENTION

The present invention is directed to a system and method for managing diagnostic and performance information for communications system terminal endpoints (TEs) communicating over an Internet Protocol (IP) network. The TEs communicate by transmissions that are voice, modem, facsimile, video or data transmissions, for example.

A Diagnostic Supervisor (DS), which is capable of being coupled to the communications system, transmits Diagnostic Configuration Messages (DCMs) to the TEs. The TEs generate Diagnostic Messages (DMs) based on diagnostic information, including error statistics, voice statistics, facsimile statistics, video statistics, data statistics, or the like, concerning IP network transmissions in which the TEs participate. The DCMs instruct the TEs how to format and when to transmit DMs.

The flexibility afforded by the DCMs allows large amounts of customized diagnostic information to be delivered in a non-intrusive manner. This results from diagnostic information being transmitted when required. The DMs are transmitted by the TEs to the DS, for example. Alternatively, in a system with more that one DS, the TEs can transmit DMs to the plural DSs, other TEs or any network device.

The DS can be programmed locally or remotely to send various types of DCMs. The DS can also be programmed locally or remotely to provide diagnostic reports based on DMs that were delivered to network users or to the network administrator, for example.

In one embodiment of the present invention, the system can generate a quality of service value based on the diagnostic information provided by the DMs. The quality of service may then be used by the system to enhance the Internet transmission properties of the communication.

In another embodiment of the present invention, the system can vary the packet size of transmitted packets based on the diagnostic information. The adjustment of the packet size can be initiated by the DS, a TE, or by a TE with DS capabilities. Alternatively, adjustment of the packet size can be initiated by a TE user, the network administrator or a communications system attendant.

In another embodiment of the present invention, the system can reroute an IP network transmission between two or more TEs to the public switched telephone network (PSTN) based on the diagnostic information. Rerouting can be initiated by the DS, a TE, or by a TE with DS capabilities. Alternatively, rerouting can be initiated by a TE user, the network administrator or a communications system attendant.

In another embodiment of the present invention, DCMs can be configured to instruct TEs to transmit DMs including silent packet diagnostic information. The silent packet diagnostic information can be used to provide the system with disconnect supervision of IP transmissions by determining the average number of silent packets detected over a period of time, or by a total count of silent packets.

In still another embodiment of the present invention, DCMs can be configured to instruct TEs to transmit DMs including non-silent packet diagnostic information. The non-silent packet diagnostic information can be used to provide the system with answer detection supervision of IP transmissions by determining the average number of non-silent packets detected over a period of time, or by a total count of non-silent packets.

In yet another embodiment of the present invention, the diagnostic information comprises a plurality of parameters defined by the DCMs and the DMs. A DS or TE can be programmed to determine an average number of occurrences of one of the plurality of parameters or a total number of occurrences of one of the plurality of parameters.

One embodiment of the present invention provides for attendant supervision of the communications system. In this embodiment a human attendant provides real-time response to the diagnostic information. Alternatively, billing management can be performed for the communications system using diagnostic information. For example, billing of an IP network transmission, or a transmission rerouted to the PSTN, is performed based on the diagnostic information provided by DMs.

In an exemplary embodiment of the present invention, the DS comprises a Configuration Manager, a Report Manager, a Real-Time Response Manager, and an Input/Output (I/O) Manager coupled to the IP network and the PSTN. The DS can also include a communications system so that it can function as a TE.

BRIEF DESCRIPTION OF THE DRAWINGS

These and other aspects of the invention will become apparent from the following descriptions which illustrate exemplary embodiments of the invention when read in conjunction with the accompanying drawings, in which.

DETAILED DESCRIPTION OF THE PREFERRED EMBODIMENTS

I. Overview of the Technology

Figure 1:
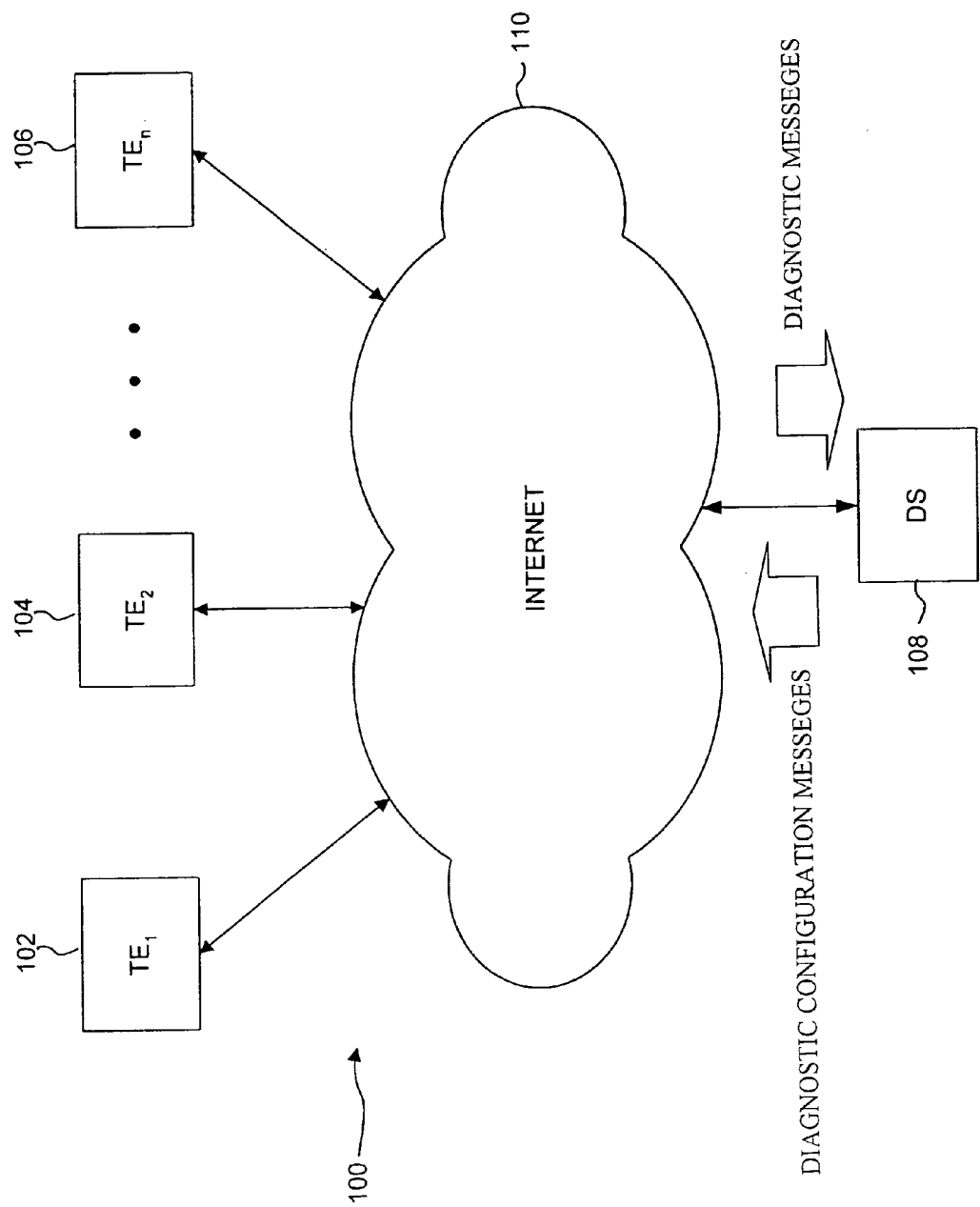
FIG. 1 illustrates a system for communicating diagnostics or other feedback concerning IP transmissions from one or more terminal endpoints (TEs) to a Diagnostic Supervisor (DS) according to an embodiment of the system and method of the invention.

The following section is an overview of basic Internet-related concepts, as discussed in Pricewaterhouse Coopers® Technology Forecast: 1999 (Pricewaterhouse Coopers Technology Center, Menlo Park, Calif., 94025; order #TC-01-09).

Voice calls or facsimile transmissions, which are not distinguished from voice calls by the phone network, must first be converted from analog signals into digital form. This conversion is performed by a codec, i.e., a compression and decompression device. Codec devices convert analog voice to digital signals and digital signals back to analog, for example. A codec device may be implemented either in software or special-purpose hardware.

Digitally encoding of voice calls is also done in the PSTN for interoffice transmission by systems such as private branch exchanges (PBXs). However, the codecs used for VoIP use bandwidth more efficiently than the those used in the PSTN, carrying voice in as little as 5 Kbps compared with the 64 Kbps needed by the phone network.

Once digitized, the encoded voice data is then wrapped within IP packets, using a Real-Time Transport Protocol (RTP), which runs over UDP. As described above, UDP is the connectionless transport protocol in the TCP/IP protocol suite. The UDP protocol serves as the counterpart to TCP, which is the connection-oriented protocol. IP packets are carried over a TCP/IP network. Call setup and control-type features for voice, modem, facsimile, video and data systems are based on the H.323 Internet telephony standard, which is described below.

Under some conditions, it is desirable to incorporate some form of quality of service (QoS) features that can give a higher priority to delay-sensitive traffic such as voice than to less-delay-sensitive data, for example. These features can be provided by resource reservation protocol (RSVP) or by other mechanisms that enable network administrators to deliver traffic defined as high priority before less time-sensitive traffic. Illustratively, a video conference may be designated as high priority traffic.

A. VoIP-to-PSTN Gateway

A VoIP-to-PSTN gateway is typically used to permit access to all telephone devices, not merely those connected to an IP network. The gateway functions to convert the calls between analog voice and packet data and translates between the VoIP call control system and the protocols used in the PSTN, i.e., such as, Signaling System 7 (SS7).

Most VoIP-based IXCs provide a bank of incoming phone lines at each of their points of presence (POPs). To initiate a network call, a user calls the VoIP gateway from a standard analog telephone or fax machine. The gateway provides either a simulated dial tone or some other tone. The user enters the destination telephone number as well as a personal identification number (PIN) for billing. The IXC establishes an IP transmission between the user's local POP and another POP close to the call's destination. The destination gateway then places a standard local call to the final destination, and the voice or fax link is created.

It should be appreciated that in practice, an Internet Exchange Carrier (IXC) system typically would be more integrated into the local phone network than suggested herein. As a result, the subscriber would dial the long-distance phone number, and the calling number as well as the call itself would be transmitted transparently over the local phone network to the POP.

B. The H.323 Internet Telephony Standard

H.323 is an Internet telephony standard from the ITU-T that defines multimedia communication over packet-switched networks that do not provide guaranteed QoS. H.323 is an extension of the original H.320 standard, which specified criteria for video conferencing over ISDN and other circuit-switched networks. H.323 extends H.320 for use on networks such as the Internet and private IP networks. H.323 is adapted to support many aspects of multimedia, but requires only voice and, as such, generally is regarded as the standard for VoIP. H.323 defines the basic capabilities Internet telephony software must support. H.323 also specifies requirements for call control, audio, and video compression technologies.

The H.323 standard is directed to the types of data streams required for Internet telephony. All telephone software must support specified audio, such as speech, and call-control signals that permit telephones to find each other, determine each others characteristics, and then monitor call status. This standard also specifies lowest-common denominator compression protocols, such as G.711 (audio compression over 64-Kbps data path), G.723 and G.729 (audio compression over an analog modem). H.323 also specifies the functions to be performed by a network control server, known as the "gatekeeper."

Currently, H.323 requires that Internet telephones also adhere to H.245, the ITU-T standard for telephony control functions. H.245, along with the associated H.225.0 and Q.931 standards, defines how a phone should connect to another phone over the Internet, start a conversation, determine the capabilities of the receiving phone, and hang up a call. During call initiation, the devices use H.245 to determine proper compression protocols and also whether the phones support full-duplex or half-duplex transmission. They also agree on what resolution is recommended for video, which encryption capabilities are supported or desired, and the maximum "jitter" that will be allowed before the session is terminated. Jitter may be characterized as the variation in delivery time for data packets.

Other Internet standards are under development, including the Session Initiation Protocol (SIP) and the Simple Gateway Control Protocol (SGCP). SIP, a signaling protocol for Internet conferencing and telephony, handles basic call setup functions as well as enhanced services such as call forwarding. SIP addresses users by an e-mail-like address and reuses some of the infrastructure used for Internet e-mail delivery such as DNS MX (Domain Name System mail forwarding) records. In addition to its own address format, SIP can handle H.323 addresses or telephone numbers (as defined by the E.164 standard). SGCP is part of a VoIP architecture that distributes the voice-to-IP gateway functions between the actual gateways, which perform translation between voice signals and IP packets, and a server known as the "call agent," which handles complex signaling protocols such as SS7. SGCP handles the communication between the call agent and the gateways. SGCP primarily is designed to serve as a simple "remote control" protocol that the call agent uses to program gateways according to instructions received through signaling protocols such as H.323 or SIP.

C. Real-Time Transport Protocol and Real-Time Control Protocol

The Real-Time Transport Protocol (RTP) handles end-to-end, real-time delivery of data such as video and voice. RTP transports data over the UDP and does not guarantee in-time delivery, order of delivery, or even delivery at all. RTP provides functionality that is required for real-time multimedia traffic, including content identification, timing reconstruction, loss detection, and security. With RTP, data can be delivered to one or more destinations, and limits any delay variation. RTP can take advantage of resource reservation protocols such as RSVP and communicating dynamically to allocate appropriate bandwidth. However, RTP itself does not provide for guaranteed bandwidth or other QoS features.

Time stamps and header information are provided by RTP, which distinguish whether an IP packet is data or voice. This allows prioritization of voice packets. RSVP allows networking devices to reserve bandwidth for carrying unbroken multimedia data streams.

A companion protocol to RTP is Real-Time Control Protocol (RTCP), which analyzes network conditions. RTCP provides feedback to RTP data sources and recipients in a periodic transmission fashion. RTCP permits adjustment to changing network loads by reporting to senders and receivers various types of variations in network performance.

II. System Description of an Embodiment of the Invention

In FIG. 1, a system 100 is shown for communicating diagnostics or other feedback concerning Internet transmissions from one or more terminal endpoints $TE_1$-$TE_n$ (102, 104 through 106, respectively) to a Diagnostic Supervisor (DS) 108. The transmissions between the TEs and the DS are performed using Internet protocol, as shown generally at Internet cloud 110. According to the present invention, the Internet cloud 110 may be the public Internet or private internet, i.e., an Intranet. Accordingly, it should be appreciated that as used herein, the term Internet is inclusive of an Intranet.

As will be described in detail below, according to the system and method of the invention the terminal endpoints ($TE_1$-$TE_n$) are programmable to provide diagnostic information over the Internet 110 to each other or to the DS 108. The diagnostics are dependent on the type of transmission, which can be either an Internet telephone voice call, transfer of video, facsimile, data, or control information. Known methods and protocols to communicate voice, modem, facsimile, video, data and control information over the Internet 110 would be apparent to a person skilled in the relevant arts of Internet telephony and VoIP.

Diagnostic information provided in this manner can give a network administrator advance warning of client problems, and/or historical data performance profiles. This can allow the network administrator to initiate solutions to problems. These solutions might perhaps be initiated even in advance of the client's recognition of the problem. A plethora of uses for diagnostic information can be provided according to the system and method of the invention as envisioned by the inventors. Many of the uses of diagnostic information according to the present invention are described below by way of example and not limitation. In particular, diagnostic information may be utilized to adjust the size of the packets in which data is transmitted. The adjustment of the packet size may, in some cases, cure problems in the transmission over the Internet.

Figure 2:
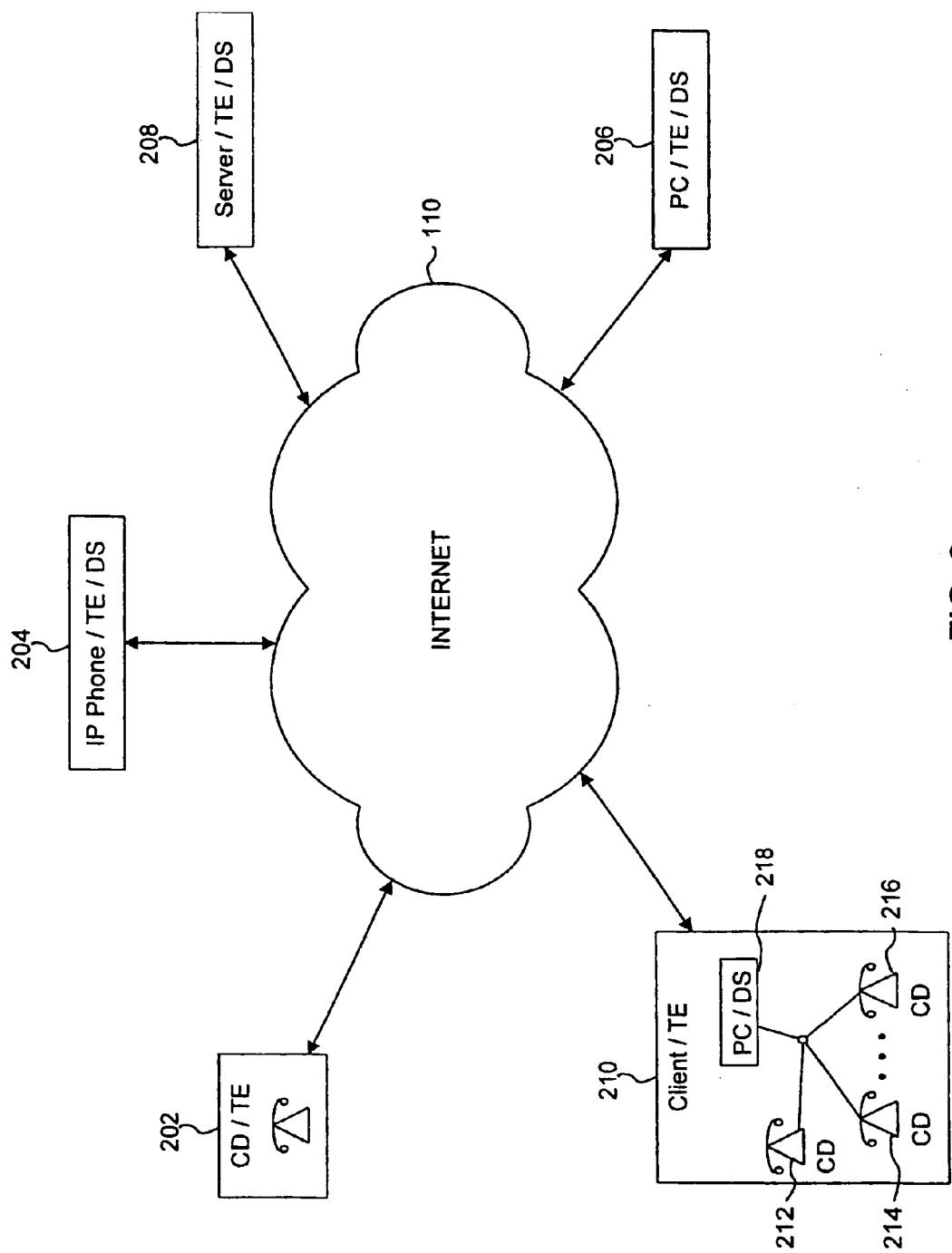
FIG. 2 illustrates various types of TEs in a system similar to that depicted in FIG. 1 for communicating diagnostics or other feedback concerning IP transmissions according to another embodiment of the system and method of the invention.

The terminal endpoints 102, 104–106 of FIG. 1 can be implemented in a variety of ways. FIG. 2 illustrates various types of terminal endpoints in a system similar to that depicted in FIG. 1 for communicating diagnostics or other feedback concerning Internet transmissions according to the present invention. In the simplest form a terminal endpoint is a communication device, such as a standard telephone with an IP gateway, which is illustrated at 202. Alternatively, a terminal end point can comprise an Internet phone, as illustrated at 204. Moreover, the Internet phone 204 can include the functionality of a diagnostic supervisor.

Another example of a terminal endpoint is a personal computer 206, which can also function as a diagnostic supervisor. Other examples of terminal endpoints include servers and clients. A server terminal endpoint is illustrated in 208, which can also serve as a diagnostic supervisor. FIG. 2 also illustrates a client terminal endpoint 210. The client/TE 210 is effectively a node capable of switching between a plurality of communication devices such as phones 212, 214 through 216. Alternatively, a personal computer communication device or a personal computer communication device also functioning as a diagnostic supervisor can be connected to the node and be part of the client/TE 210. Such a PC/DS is illustrated at 218. A server 208 keeps all the general information about a network's configuration. It is also considered a master of the network, unless its functions are distributed.

Figure 3:
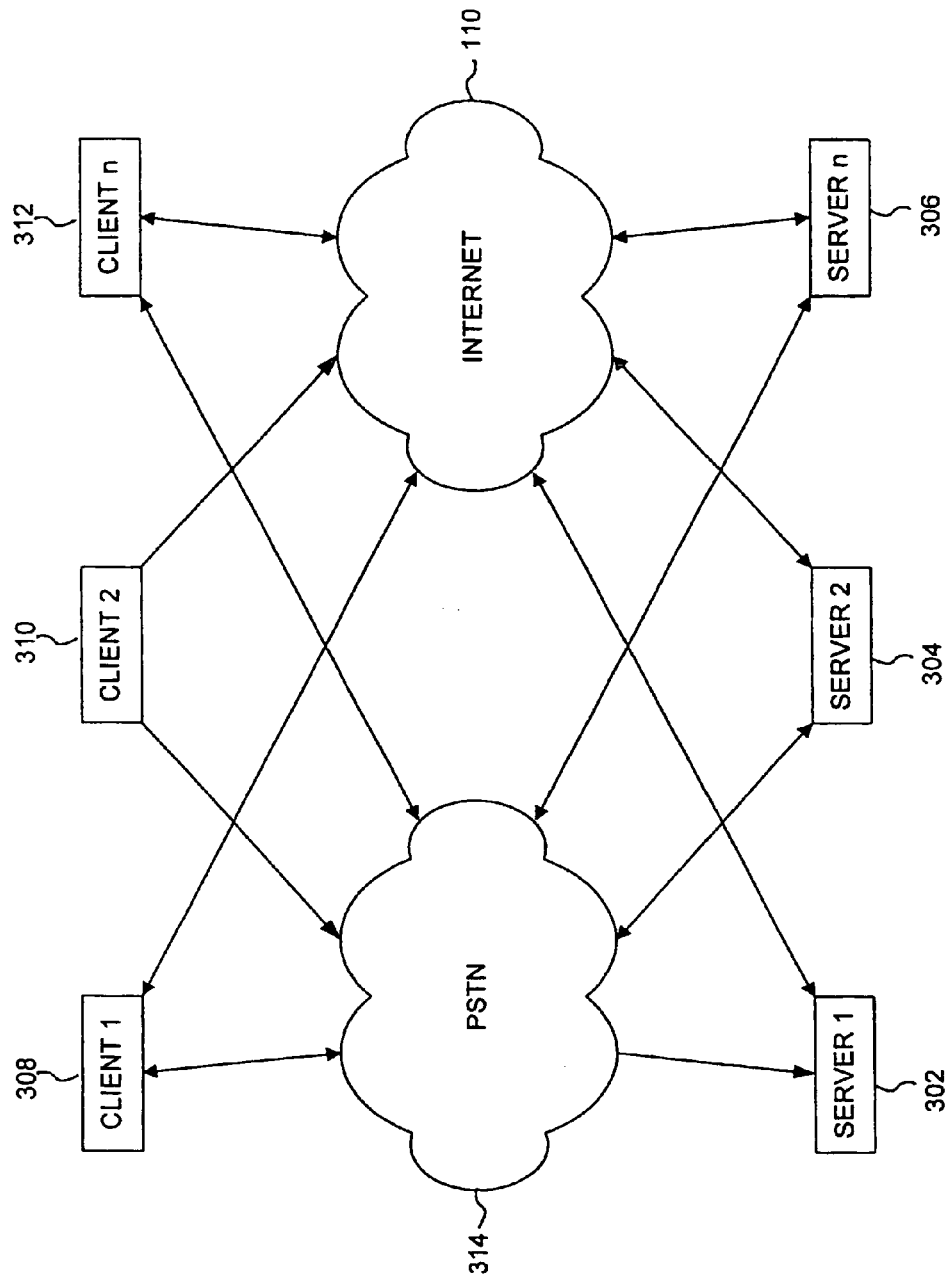
FIG. 3 illustrates a distributed diagnostics management system of servers and clients that communicate via the Internet according to another embodiment of the system and method of the invention.

FIG. 3 illustrates a distributed diagnostics management system of servers (302,304, 306) and clients (308, 310, 312), which communicate via the Internet 110. IP transmissions between servers and clients, between plural servers, or between plural clients can also be routed via the PSTN 314. In this embodiment, the diagnostic supervisory functions can be distributed or can be redundant between multiple servers, such as server 1, or server 2 through server n. The exemplary functions to be performed by a diagnostic supervisor will now be described in connection with FIG. 4.

Figure 4:
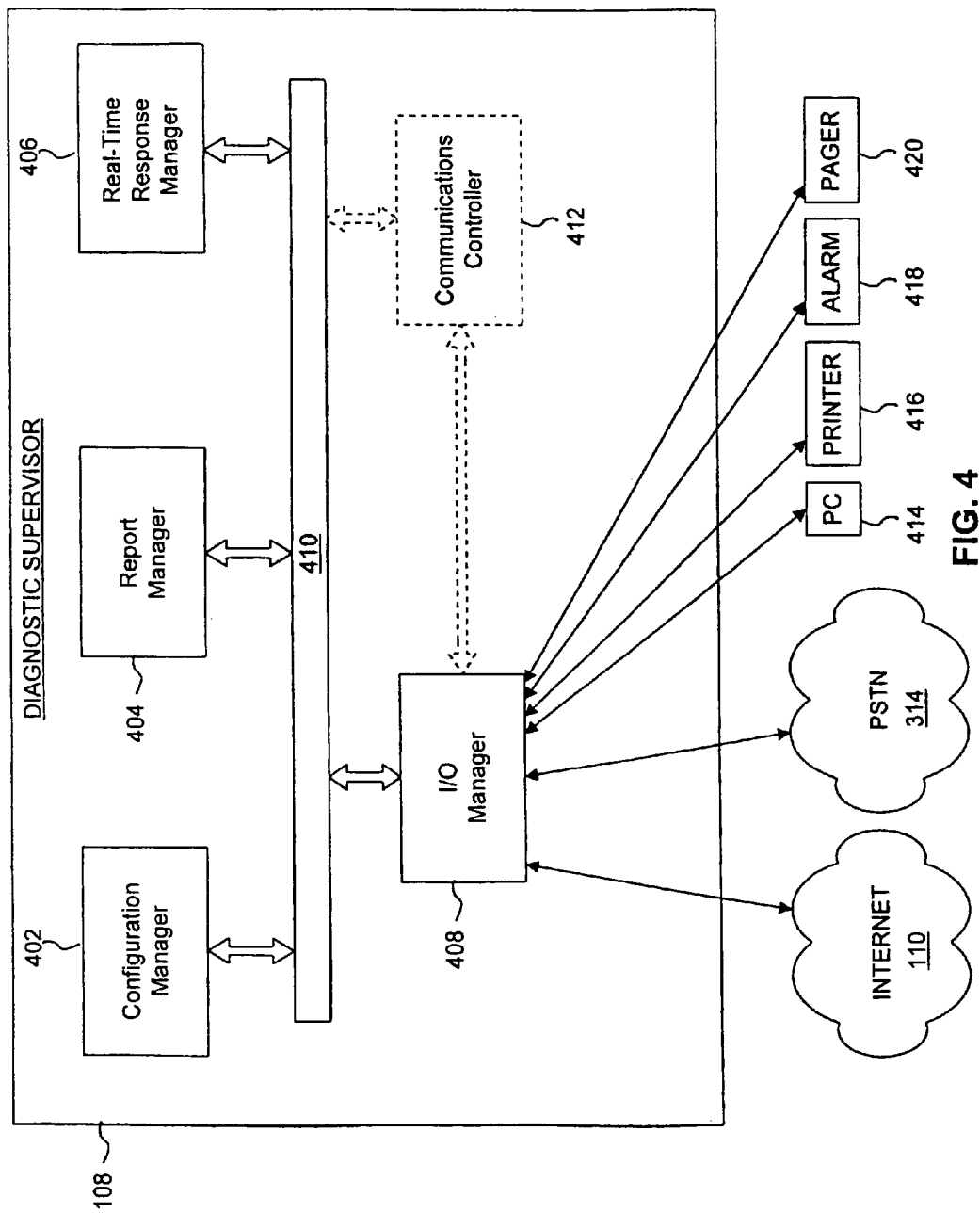
FIG. 4 illustrates an exemplary architecture of a DS according to an embodiment of the system and method of the invention.

FIG. 4 illustrates an exemplary architecture for a Diagnostic Supervisor 108, according to the present invention. The Diagnostic Supervisor 108 includes a Configuration Manager 402, a Report Manager 404, a Real-time Response Manager 406, and an Input/Output (I/O) Manager 408. These four managers are interconnected by a bus system 410, which permits the four managers to communicate directly with each other in a flexible manner. Alternatively, direct wiring or busing between each of the four managers can be provided, as would be apparent to a person skilled in the relevant art.

The Diagnostic Supervisor 108 can also include an internal or external communication controller 412 in accordance with one embodiment of the system and method of the invention. The communication controller 412 handles call functions such as call control and VoIP management. The communication controller 412 can be directly coupled to the bus system 410, and thus can be considered an integral part of the Diagnostic Supervisor 108. Alternatively, the communication controller 412 can be external to the Diagnostic Supervisor 108 and be coupled to the Diagnostic Supervisor 108 through the I/O manager 408. Managers 402, 404, 406 and communication controller 412 can communicate via the I/O manger 408 with the Internet 110 and the PSTN 314. Alternate implementations can combine one or more of the managers 402, 404, 406, 408 into one entity.

The Configuration Manager 402 of the Diagnostic Supervisor 108 permits a user or network administrator to configure the diagnostic information to be provided by terminal endpoints before, during or after an Internet transmission (e.g., the VoIP call). As will be described in detail below, the Configuration Manager 402 is programmable to provide diagnostic control messages (DCMs) to TEs in order to configure the terminal endpoints (TEs) to provide the desired diagnostic information.

The network administrator can program the Configuration Manager 402 to generate DCMs in a variety of manners. For example, the network administrator can program the Configuration Manager 402 by a personal computer 414 via the Diagnostic Supervisor 108 via the I/O manager 408. Alternatively, the network administrator can program DCMs using the Configuration Manager 402 remotely over an Internet transmission, via a telephone link and the PSTN 314, or by a direct connection, such as a serial, parallel, or optical port directly to the Diagnostic Supervisor 108. Such direct connections, which may be hardwired or wireless, are not shown in FIG. 4.

The Report Manager 404 receives Diagnostic Messages (DMs) from terminal endpoints configured by DCMs to relay diagnostic information or "events" to the DS 108. DMs are received by the Report Manager 404 via the I/O manager 408 and bus network 410. The DMs can be transmitted from TEs via the Internet 110 or the PSTN 314.

In an alternative embodiment of the present invention in which the diagnostic supervisor includes a communication controller 412, the Report Manager 404 can also receive DMs from the communication controller 412. In this alternative embodiment, the communication controller 412 is the equivalent of a terminal endpoint and thus is also configured by DCMs from the Configuration Manager 402 to relay DMs to the Report Manager 404. Thus, the Diagnostic Supervisor 108 receives DMs reflecting its own events.

The Report Manager 404 is programmable to provide reports for the network administrator in a human readable format. For example, reports can be provided by the Report Manager 404 in text form, graphic user interface form via the PC 414, as voice messages, or simply as printouts via a printer 416. Based on the below discussion of diagnostic configuration messages and diagnostic messages, the programming of Report Manager 404 to produce reports for the network administrator would be apparent to a person skilled in the relevant art. Moreover, the Report Manager 404 can be programmed to provide reports to the network administrator, other user or any network device over the Internet 110 or PSTN 314 via the I/O manager 408 and bus network 410.

The Real-Time Response Manager (RTRM) 406 also receives DMs and acts in real-time to perform any necessary response to events. In addition to the various responses provided by the RTRM 406 as described below, it can generate external warnings using devices such as an external alarm 418, pager device 420, or the like, as would be apparent to a person skilled in the relevant art.

Figure 5:
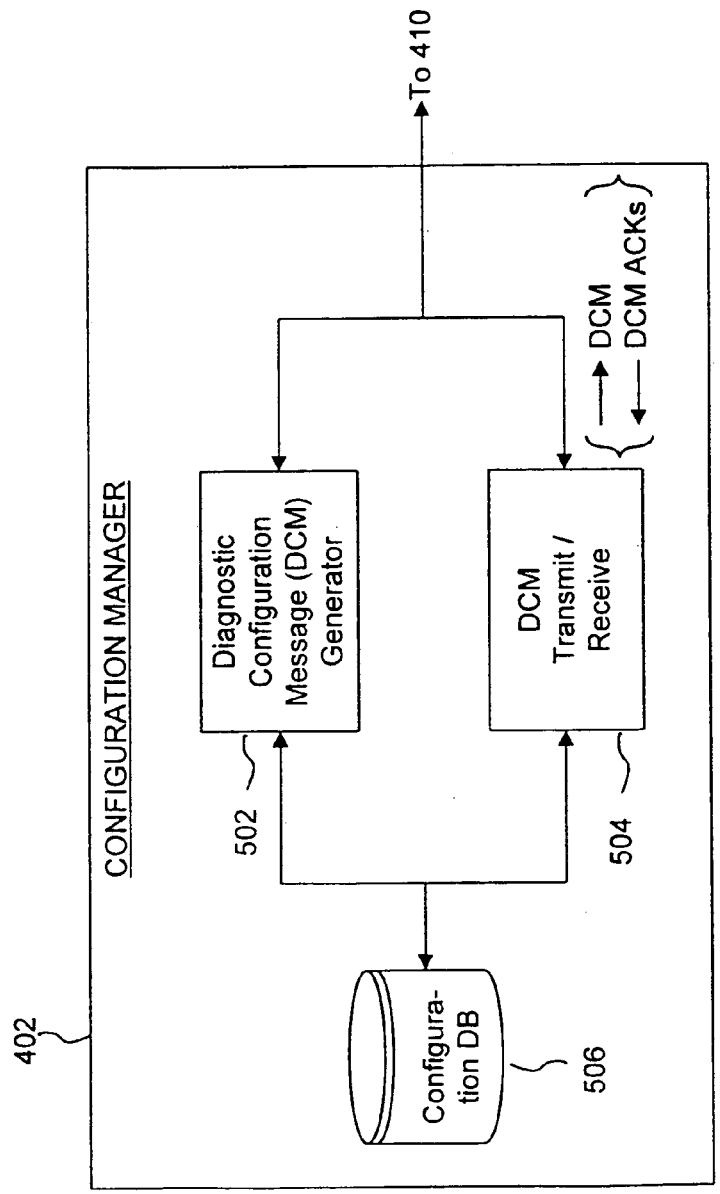
FIG. 5 illustrates an exemplary architecture of a Configuration Manager according to an embodiment of the system and method of the invention.

FIG. 5 illustrates an exemplary architecture for the Configuration Manager 402 according to an embodiment of the present invention. The Configuration Manager 402 includes a Diagnostic Configuration Message (DCM) Generator 502, a DCM Transceiver Unit 504 and a configuration database 506. The DCM Generator 502 permits a network administrator to create DCMs in order to configure TEs.

In accordance with the system and method of the invention, Table 1 includes exemplary Diagnostic Configuration Messages (DCMs), each in the form of an information element (IE). The IEs may have a format as shown in Table 1. Column (a) of Table 1 is the Field Number that lists the sequential number of information fields in the IE. Column (b) is the Field Length (octet) that gives the length in eight bit octets of each information field. An octet is a byte made up of eight bits. Column (c) is the Information Field Name that lists the name of each information field used in the E. Column (d) is the Information Field Description that describes the function, format and purpose of each information field in the IE. The last column (e) in Table 1 is the Format and Value that defines the value or data format used in each information field. Unless noted otherwise in the field description, the data format used in each information field is an unsigned hexadecimal value. If the information field is composed of more than one octet, the first octet is the most significant byte and the last octet is the least significant byte.

The diagnostic parameters of the DCM for QoS, for example, are delivered in a Q.931/H.225.0 "like" block messages. The DMs described below are also delivered through Q.931/H.225.0 "like" block messages. The DM message formats are described below in connection with Table 2.

TABLE 1

Diagnostic Configuration Messages (DCMs) in Information Element (IE) Format

| Field No. (a) | Field Length (b) | Information Field Name (c) | Information Field Description (d) | Format and Value (e) |
|---|---|---|---|---|
| 1 | 1 | QoS_TRAP_IE (1) | This is the information element identifier field for the DCM (QoS_DIAGNOTICE_IE). This is a fixed length information element | 0xXX |

TABLE 1-continued

Diagnostic Configuration Messages (DCMs) in Information Element (IE) Format

| Field No. (a) | Field Length (b) | Information Field Name (c) | Information Field Description (d) | Format and Value (e) |
|---|---|---|---|---|
| 2 | 2 | IE_Length | This field defines the length of the "contents" of the information element. | Hex |
| 3 | 1 | MODE | This field is bit mapped. The first bit turns on and off auto reporting. The second bit provides for a one time report in response to each QoS_TRAP_IE received.<br>$1^{st}$ Bit: "1" Auto Reporting on<br>"0" Auto Reporting off<br>$2^{nd}$ Bit: "1" One time response on<br>"0" One time response off | Hex |
| 4 | 2 | SOURCE | This field provides the address of the TE that is being configured for auto-reporting of diagnostic information. | Hex |
| 5 | 1 | DESTINATION | This field tells the TE where to send the diagnostic reports. The last type octets define the IP address. The first byte is bit mapped. When each bit is set to "1" the diagnostic report is sent to the location defined as follows:<br>$1^{st}$ bit  Communications controller<br>$2^{nd}$ bit  Far end party<br>$3^{rd}$ bit  Far end party and all conference partners<br>$4^{th}$ bit  Diagnostic TSAP 1 defined below<br>$5^{th}$ bit  Diagnostic TSAP 2 defined below | Hex |
| 6 | 2 | DESTINATION 1_TSAP | This field defines the IP address and port where the diagnostic messages are sent. | Hex |
| 7 | 2 | DESTINATION 2_TSAP | This field defines the IP address and port where the diagnostic messages are sent. | Hex |
| 8 | 1 | LOST_ PACKETS_ TRAP | This field defines the value at which the percentage of lost packets will cause a diagnostic report to be sent. The period of time over which the percentage of lost packets is calculated is defined below. | Hex |
| 9 | 2 | LOST_ PACKETS_ TIME | This field defines the time period in seconds over which the percentage of lost packet is calculated. During a call, the percentage of lost packet is calculated over consecutive time intervals until the completion of the call. | Hex |
| 10 | 1 | SILENCE_ PACKETS_ TRAP | This field defines the value at which the percentage of silence packets will cause a diagnostic report to be sent. K, the period of time over which the percentage of lost packets is calculated, is defined below.<br>Note: This trap can be used to perform disconnect supervision when an IP/Voice gateway is bridged to a PSTN station, trunk, or service that does not provide disconnect supervision. | Hex |
| 11 | 2 | SILENCE_ PACKETS_ TIME | This field defines the time period in seconds over which the percentage of silence packets is calculated. During a call, the percentage of silence packets is calculated over consecutive time intervals until the completion of the call. | Hex |
| 12 | 1 | NON_ SILENCE_ PACKETS | This field defines the value at which the percentage of non-silence packets will cause a diagnostic report to be sent. The period of time over which the percentage of lost packets is calculated is defined below.<br>Note: This trap can be used to perform answer detection when an IP/VOICE gateway is connected to a PSTN station or trunk or service that does not support answer detection. | Hex |
| 13 | 1 | NON_SILENCE_ PACKETS_ TIME | This field defines the time period in seconds over which the percentage of non-silence packets is calculated. During a call, the percentage of silence packets is calculated over consecutive time intervals until the completion of the call. | Hex |

TABLE 1-continued

Diagnostic Configuration Messages (DCMs) in Information Element (IE) Format

| Field No. (a) | Field Length (b) | Information Field Name (c) | Information Field Description (d) | Format and Value (e) |
|---|---|---|---|---|
| 14 | 2 | AVG_JITTER_TRAP | This field defines the value at which the average packet jitter will cause a diagnostic report to be sent. The period of time over which the average packet jitter is calculated is defined below | Hex |
| 15 | 2 | AVG_JITTER_TIMER | This field defines the time in units of seconds over which the jitter average is calculated. | Hex |
| 16 | 2 | INVALID_HEADER | This field defines the value at which the number of packets with invalid headers will cause a diagnostic message to be sent by the TE. The period of time over which the total number of invalid headers is counted is defined below. | Hex |
| 17 | 2 | INVALID_HEADER_TIMER | This field defines the time in units of seconds over which the invalid header count is maintained. | Hex |
| 18 | 1 | IDLE_PACKET_TRAP_ | This field defines the value at which the percentage of idle packets will cause a diagnostic report to be sent. The period of time over which the percentage of idle packets is calculated is defined below. | Hex |
| 19 | 2 | IDLE_PACKET_TIMER | This field defines the time period in seconds over which the percentage of idle packets is calculated. During a call, the percentage of silence packets is calculated over consecutive time intervals until the completion of the call. | Hex |
| 20 | 1 | REPLAY_PACKET_TRAP | This field defines the value at which the percentage of replay packets will cause a diagnostic report to be sent. The period of time over which the percentage of idle packets is calculated is defined below. | Hex |
| 21 | 2 | REPLAY_PACKET_TIMER | This field defines the time period in seconds over which the percentage of idle packets is calculated. During a call, the percentage of silence packets is calculated | Hex |
| 22 | 2 | MAX_JITTER_TRAP | This field defines the value at which the peak packet jitter will cause a diagnostic report to be sent. The period of time over which the peak packet jitter is calculated is defined below. | Hex |
| 23 | 2 | MAX_JITTER_TIMER | This field defines the time in units of seconds over which the maximum jitter is calculated. | Hex |
| 24 | 2 | COLLISION_TRAP | This field defines the value at which the number of collisions will cause a diagnostic report to be sent. The period of time over which the number of collisions is calculated is defined below. | Hex |
| 25 | 2 | COLLISION_TIMER | This field defines the time over which the number of collisions is calculated. | Hex |
| 26 | 2 | NETWORK_USAGE_TRAP | This field defines the value at which the percent usage of the network will cause a diagnostic report. | Hex |
| 27 | 2 | NETWORK USAGE TIMER | This field defines the time over which the network usage is averaged. | Hex |

Accordingly, Table 1 contains a variety of IEs. As shown in FIG. 5, the DCM generator 502 transmits DCMs via the DCM transceiver unit 504. The DCMs are sent to one or more TEs and are stacked inside the "user-to-user information element" (UUIE) attached to the Q.931/H.225.0 setup message or alerting message. The purpose of the UUIE is to convey information between Q.931/H.225.0 users (in this case the Diagnostic Supervisor 108 and TEs). The DCM conveyed in the UUIE is not interpreted by the network, but rather is carried transparently and delivered to the remote TEs. The specific coding of a UUIE is fully described in section 4.5.30 of the International Telecommunication Union (ITU) Telecommunication Standardization Sector (ITU-T) Recommendation Q.931, which was approved by the World Telecommunication Standardization Conference (WTSC) in Helsinki on Mar. 1–12, 1993. The implementation details of transporting information via the UUIE therefore would be apparent to a person skilled in the relevant art.

The DCMs configure the TEs to provide DMs back to the Diagnostic Supervisor 108. This configuration permits the TEs to provide a variety of diagnostic parameters that give real time information about the quality of the inbound and outbound voice, modem, facsimile, video or data streams for a given IP transmission. This diagnostic information can be polled, i.e., requested, by the communications controller 412 of a combined DS/TE or from any TE participating in an IP transmission. In addition to polling, the diagnostics can be automatically delivered to the DS or any participating DS/TE or TE. This automatic delivery of diagnostics is provided based on parameters contained in the DCMs which are generated by the Configuration Manager 402.

The configuration database 506 can be used by the DCM generator 502 or network administrator to store various different configurations. For example, configuration database 506 can store logs of transmitted DCMs, including, for example, a copy of the DCMs, a list of the target TEs and time and date information. The configuration database 506 can also store DCM acknowledgments received by the DCM Transceiver 504 from recipient TEs or from the communication controller 412.

With reference to Table 1, various features of the DCM information element (IE) format will be explained. The DCM can be in the format of a Q.931/H.225.0 block message. The first field in the DCM is the information element identifier. Appended to the information element identifier are information elements labeled field numbers 2–23. Field number 2 represents the length of the DCM information element. Field number 3 is the Mode Information field, which is a bit mapped byte. One bit turns off auto reporting. The second bit provides for a one time report as a compelled response to DCM IE. Field number 4 is the Source Information field, which provides the address of the IP-Board of the TE that is being configured for auto-reporting of diagnostic information.

Field number 5 is the Destination Information field, which tells the IP-Board where to send the DM. For example, when the first bit it set to "1" the DM sent to the local communication controller 412 (where the IP-Board would typically reside) and the Report Manager 404. If the second bit is set to "1" the DM is sent to the far end party. Setting bits 3 to 5 yields the functionality listed in Table 2, field number 5, column (d). Fields 6 and 7 represent additional destinations to which the DMs are sent.

Field numbers 8–27 represent example parameters that a TE can be configured to trap. In other words, a TE is configured by the DCM to keep track of certain parameters and relay them according to the configuration specified by the DCM in field numbers 5–27. For example, field number 8 lists the LOST_PACKETS_TRAP information field. This field defines the value at which the percentage of lost packets will cause a DM to be sent. The period of time over which the percentage of lost packets is calculated is defined in field number 9, which is the LOST_PACKETS_TIME information field.

Similarly, a SILENT_PACKET_TRAP is defined by fields 10 and 11 and a NON-SILENT_PACKET_TRAP is defined in field numbers 12–13. An Average_Jitter_Trap is defined in field numbers 14 and 15. An INVALID_HEADER_TRAP is defined in field numbers 16 and 17. An IDLE_PACKET_TRAP is defined in field numbers 18 and 19. A REPLAY_PACKET_TRAP is defined in fields 20–21 and a MAXIMUM_JITTER_TRAP is defined in field numbers 22 and 23.

Field numbers 24–27 represent further parameters, in accordance with the system and method of the invention, that a TE can be configured to trap. Illustratively, the information in fields 24–27 may be used to vary the packet size used in a transmission, as is described in detail below. Accordingly, the TE is configured by the DCM to keep track of the additional parameters listed in field numbers 24–27 and relay them to destinations specified by the DCM.

As shown in Table 1, a COLLISION_TRAP is defined by field 24. This field defines the value at which the number of collisions will cause a TE to send a diagnostic report. A collision-timer is defined by field 25. Field 25 defines the time over which the number of collisions is calculated.

A NETWORK_USAGE_TRAP is defined in field number 26. This field defines the value at which the percent usage of the network will cause a diagnostic report. Additionally, a NETWORK_USAGE_TIMER is defined by field 27. This field defines the time over which the network usage is averaged.

Once configured, a TE is then capable of responding to DCMs by transmitting DMs to the destination or destinations specified in field numbers 5–7 of the IE corresponding to the DCM as described above.

Table 2 lists an exemplary information element format for a Diagnostic Messages (DM) according to the present invention. As with DCMs, DMs are defined in a set of Q.931/H.225.0 "like" information elements. The Diagnostic Message Information Element (DM IE) can be stacked inside the UUIE when transmitted over a H.323 network.

As shown in Table 2, column (a) lists the sequential number of information fields in the IE. Column (b) lists the length in eight bit octets of each information field. Column (c) lists the name of each information field used in the IE. Column (d) describes the function, format and purpose of each information field in the IE. The last column (e) defines the value or data format used in each information field. Unless noted otherwise in the field description, the data format used in each information field is an unassigned hexadecimal value. If the information field is composed of more than one octet, the first octet is the most significant byte and the last octet is the least significant byte.

TABLE 2

Diagnostic Message (DM) in Information Element (IE) Format

| Field No. (a) | Field Length (octet) (b) | Information Field Name (c) | Information Field Description (d) | Format and Value (e) |
|---|---|---|---|---|
| 1 | 1 | QoS_ DIAGNOSTIC_ IE (1) | This is the information element identifier field for the DM (QoS_DIAGNOSTIC_IE). This is a fixed length information element. | 0xXX |
| 2 | 2 | IE_Length | This octet defines the length of the "content" of the information element. | Hex |

TABLE 2-continued

Diagnostic Message (DM) in Information Element (IE) Format

| Field No. (a) | Field Length (octet) (b) | Information Field Name (c) | Information Field Description (d) | Format and Value (e) |
|---|---|---|---|---|
| 3 | 2 | Call Reference | This is the call reference field. This 2 octet field identifies the call from which the diagnostic information is provided. For multiparty conferences, each party may have a different call reference value. | Hex |
| 4 | 2 | Conference ID | For multi-party conference calls, this 2 octet field identifies the conference number. | Hex |
| 5 | 2 | Source | This field identifies the IP address of the TE that is sending the QoS diagnostic information element. This field may be set to 0x0000 when the IE is being sent over communications controller and represents a local TE. This field may be set to 0xFFFF when the IE is being sent over the communications controller and represents the far-end party in a two party call. | Hex |
| 6 | 1 | Media_Type | This field defines the media type being processed by the TE that sends the diagnostic message. The values for this field are defined as follows:<br>Value  Media<br><br>1  Voice<br>1  FAX-Relay<br>2  Modem<br>3  Video<br>4  Data | Hex |
| 7 | 2 | DIAG_TIME_PERIOD | This field defines the period of time in seconds over which diagnostic information is collected. If the value is 0xFFFF, diagnostic information is collected over the entire length of the call. | Hex |
| 8 | 1 | TRAP_ACTIVE1 | This is a bit mapped octet where a bit corresponds to a set of trap conditions. If a trap condition is satisfied, the bit is set to "1". The trap conditions are programmed for each TE through the IEs summarized below. If no trap condition is met, the bit is set to "0". The bit map is summarized as follows:<br>Bit  Trap Description<br><br>1st  Lost packet trap<br>2nd  Silence packet trap<br>3rd  Non silence packet trap<br>4th  Average jitter trap<br>5th  Invalid header trap<br>6th  Idle packet trap<br>7th  Replay packet trap<br>8th  Maximum jitter trap | Hex |
| 9 | 1 | TRAP_ACTIVE2 | This field is reserved for future trap diagnostics. | Hex |
| 10 | 2 | RX_PACKET_SIZE | This field defines the average packet length or size of received packets. | Hex |
| 11 | 4 | RX_PACKETS | This field defines the total number of received packets. | Hex |
| 12 | 2 | LOST_PACKETS | This counter keeps track of the number of packets not received. | Hex |
| 13 | 2 | SILENCE_PACKETS | This counter keeps track of the number of packets that contain silence information descriptors(SID). | Hex |
| 14 | 2 | IDLE_PACKETS | When an inbound packet is lost, one method for filling in the lost | Hex |

TABLE 2-continued

Diagnostic Message (DM) in Information Element (IE) Format

| Field No. (a) | Field Length (octet) (b) | Information Field Name (c) | Information Field Description (d) | Format and Value (e) |
|---|---|---|---|---|
| | | | packet is to create a "pink" noise packet. This pink noise packet is referred to as an IDLE packet. This counter keeps track of the number of times a lost packet is replaced with a pink noise packet. | |
| 15 | 2 | REPLAYED_PACKETS | When an inbound packet is lost, one method for filling in the lost packet is to replay the previous packet. This counter keeps track of the number of times a packet is replayed to fill in a lost packet. | Hex |
| 16 | 2 | DROPPED_PACKETS | Some packets are received but they come too late to fit into the jitter buffer. This counter keeps track of the number of packets that come too late to fit into the jitter buffer. | Hex |
| 17 | 2 | PLAYOUT_DELAY | This parameter provides the average delay in the voice play out unit FIFO in ms. | Hex |
| 18 | 2 | MIN_JITTER | This parameter gives the minimum packet inter-arrival time in ms. | Hex |
| 19 | 2 | MAX_JITTER | This parameter gives the maximum packet inter-arrival time in ms. | Hex |
| 20 | 2 | INVALID_HEADER | This parameter provides the number of incoming packets with invalid headers. | Hex |
| 21 | 2 | MICRO_OVERFLOW | This parameter provides the number of transmit voice packets dropped due to buffer overflow. | Hex |
| 22 | 2 | NUM_COLLISION | This parameter provides the number of collisions. | Hex |
| 23 | 2 | NETWORK_USAGE | This parameter provides the percent of time the network is in use at the near-end terminal end point. This parameter is determined by measuring the amount of time the carry detect is active. | Hex |

As with the DCM information element format as discussed above in connection with Table 1, the DM element format of Table 2 is similar to a Q.931/H.255.0 block message. The first component in field number 1 is the information element Identifier field for the diagnostic message IE. Field number 2 is the Length of the DM information element in octets. Field number 3 is the Call Reference information field, which is a two octet field identifying the call (IP transmission) from which the diagnostic information is provided.

For multi-party conferences, each party can have a different call reference value. Field number 4 is the Conference ID information field, which identifies the conference number for multi-party IP transmissions. Field number 5 is the Source information field. This field identifies the IP address of the TE that is sending the QoS diagnostic information element, i.e., the TE transmitting the DM.

A Media Type information field is illustrated in field number 6 of Table 2. This field determines the type of media being processed by the TE that sends the DM. The values for this field are specified in field 6 of Table 2 according to whether the media is voice, modem, facsimile, video or data.

Field number 7 is the diagnostic time period (DIAG_TIME_PERIOD) of the trap condition that caused the sending of the DM. If the value is xFFFF, for example, diagnostic information was collected over the entire length of the IP transmission. Field number 8 is the Trap Active 1 information field. This is a bit mapped octet in which each bit corresponds to a condition. If a trap condition is satisfied, the bit is set to "1". The trap conditions are programmed for each TE through the information element summarized in the "BIT" table listed in the information field description of field number 8 in Table 2. The trap descriptions for the Trap Active 1 information field includes: loss packets, silent packets, non-silence packets, average jitter, invalid header, idle packets, replay packets, and maximum jitter.

Field number 9 is the Trap Active 2 information field, which is reserved for future trap diagnostics. Fields 10 through 23 corresponds to various QoS parameters.

As shown above, Table 2 also includes fields 22 and 23. The information contained in fields 22 and 23 may also be utilized to generate diagnostic information regarding transmissions. Specifically, field number 22 is a NUM_COLLISION field. This parameter provides the number of collisions relative to a TE, for example.

Additionally, field 23 is a field showing the network usage. The network usage parameter provides the percentage of time the network is in use at the near-end terminal endpoint. Illustratively, this parameter may be determined by measuring the amount of time the carry detect is active.

Figure 6:
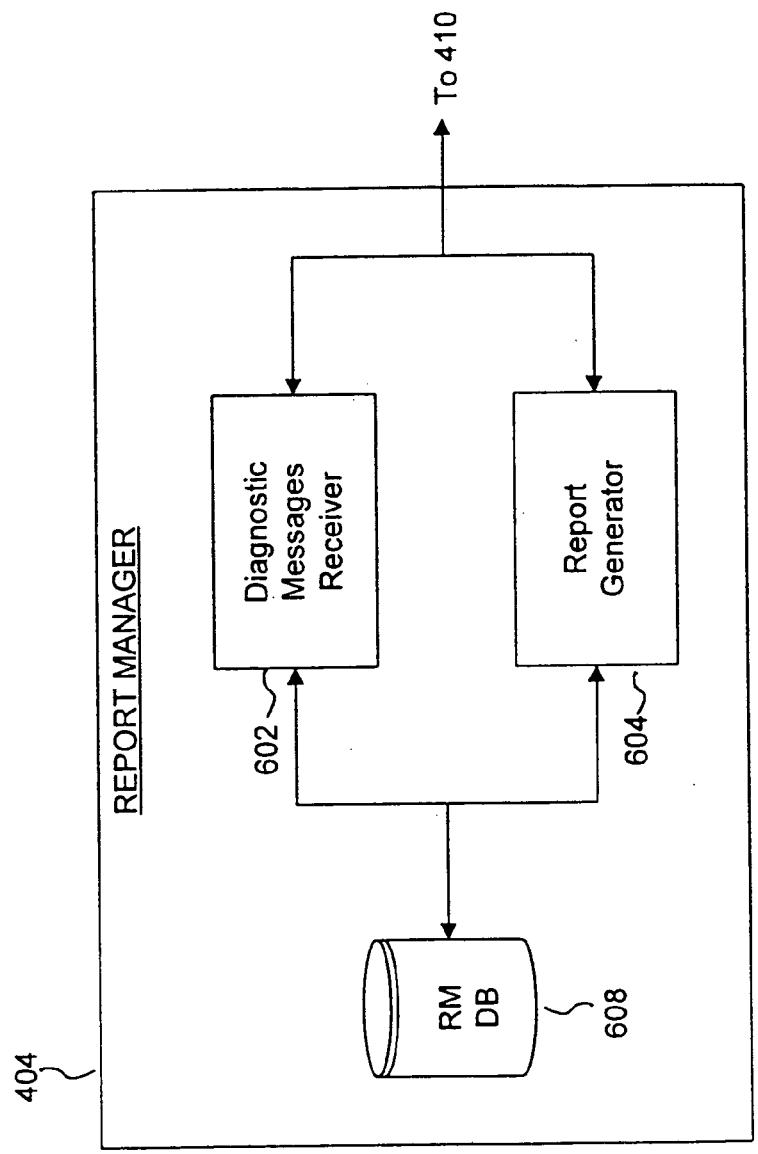
FIG. 6 illustrates an exemplary architecture of a Report Manager according to an embodiment of the system and method of the invention.

FIG. 6 illustrates an exemplary architecture for the Report Manager (RM) 404 according to the system and method of the invention. Report Manager 404 includes a diagnostic messages receiver 602, a Report Generator 604 and a RM database 608. The DM receiver 602 receives DMs from TEs or a communications controller, such as communication controller 412. DMs accepted by the DM Receiver 602 are stored in the RM database 608. The Report Generator 604 retrieves received DMs from the RM database 608 and formats reports for a user or the network administrator in a human readable fashion.

The Report Generator 604 is programmable to facilitate many report formats. Reports can be generated by Report Generator 604 and presented to the network administrator using the PC 414 or a printer 416. Alternatively, diagnostic message reports can be accessed via the Internet 110 or PSTN 314 via I/O manager 408 and the bus 410. Reports can be generated on a TE basis, a client basis, a server basis or on a partition basis if the communications network supported by the DS 108 is partitioned. Reports can be provided by the Report Manager 404 on an automatic or on a query basis.

Figure 7:
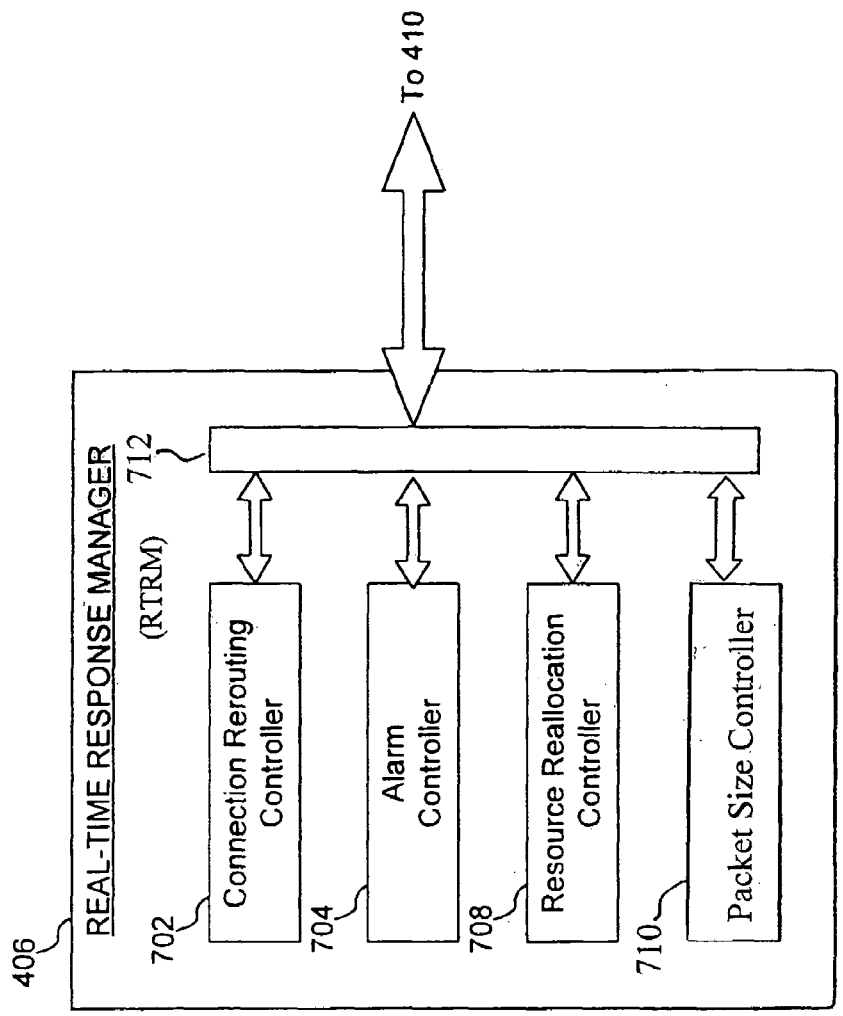
FIG. 7 illustrates an exemplary architecture of a Real-Time Response Manager (RTRM) according to an embodiment of the system and method of the invention.

FIG. 7 illustrates an exemplary architecture for the real-time response manager (RTRM) 406 according to the present invention. The RTRM 406 includes a connection Rerouting Controller 702, an Alarm Controller 704, a Resource Reallocation Controller 708, a Packet Size Controller 710 and a Bus System 712. Bus System 712 permits elements 702, 704 and 708 to communicate with each other, as well as communicate with elements external to the RTRM 406 via the bus 410.

Figure 9:
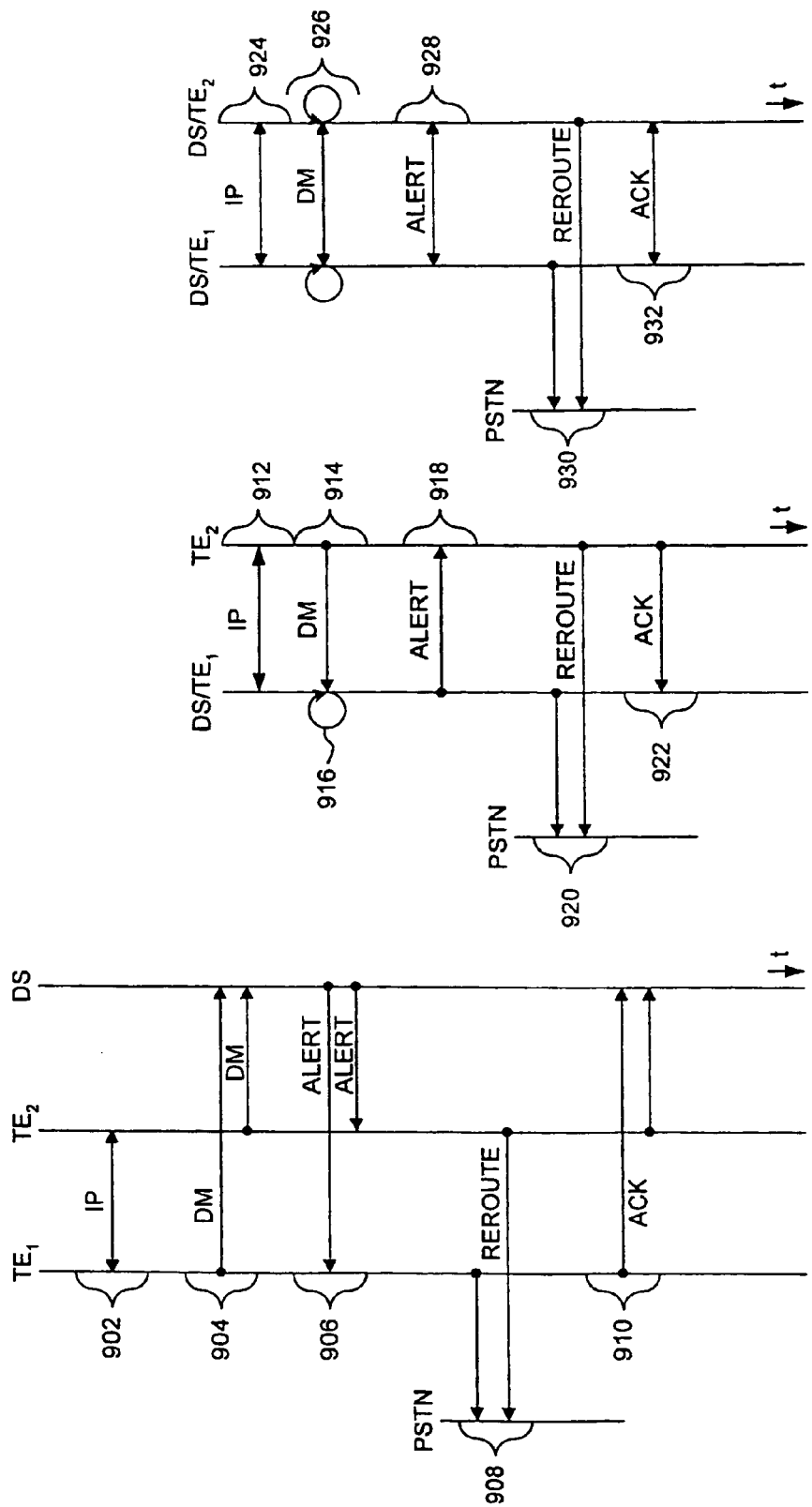
FIGS. 9A–C illustrate exemplary flow diagrams for IP transmission rerouting to the PSTN according the system and method of the invention.

A feature of the RTRM 406 according to the present invention is to respond to diagnostic messages by rerouting the transfer of data to the PSTN 314, for example. The decision to reroute the transfer of data, i.e., VoIP calls, for example, can be made by the RTRM 406, or by TEs comprising distributed call routing functionality as described in detail below in connection with FIG. 9. Parameters that can cause rerouting of a transfer of data include prioritization, parameter limit concerns, malfunctioning codecs, or the like. This data includes, but is not limited to, voice, modem, facsimile, data or video transmissions, for example.

The Alarm Controller 704 provides external alarming of a user via the alarm 418 for example, or notifications to other network devices such as TEs, distributed DSs, servers, clients, PCs, IP-phones, or the like.

The Resource Reallocation Controller 708 also responds to diagnostic information provided by DMs. The Resource Reallocation Controller 708 can adjust parameter thresholds by passing necessary adjustment information to the Configuration Manager 402, which in turn provides DCMs to TEs to thereby modify the trapping of various parameters based on the new threshold value(s). Controller 708 is capable of creating new diagnostics or disabling existing diagnostics monitored by the TEs. Controller 708 also provides transient filtering of diagnostic information to adjust thresholds, create new diagnostics or disable existing diagnostics. Moreover, the controller 708 can simply disable or enable network resources or devices such as TEs, or the like.

Figure 8:
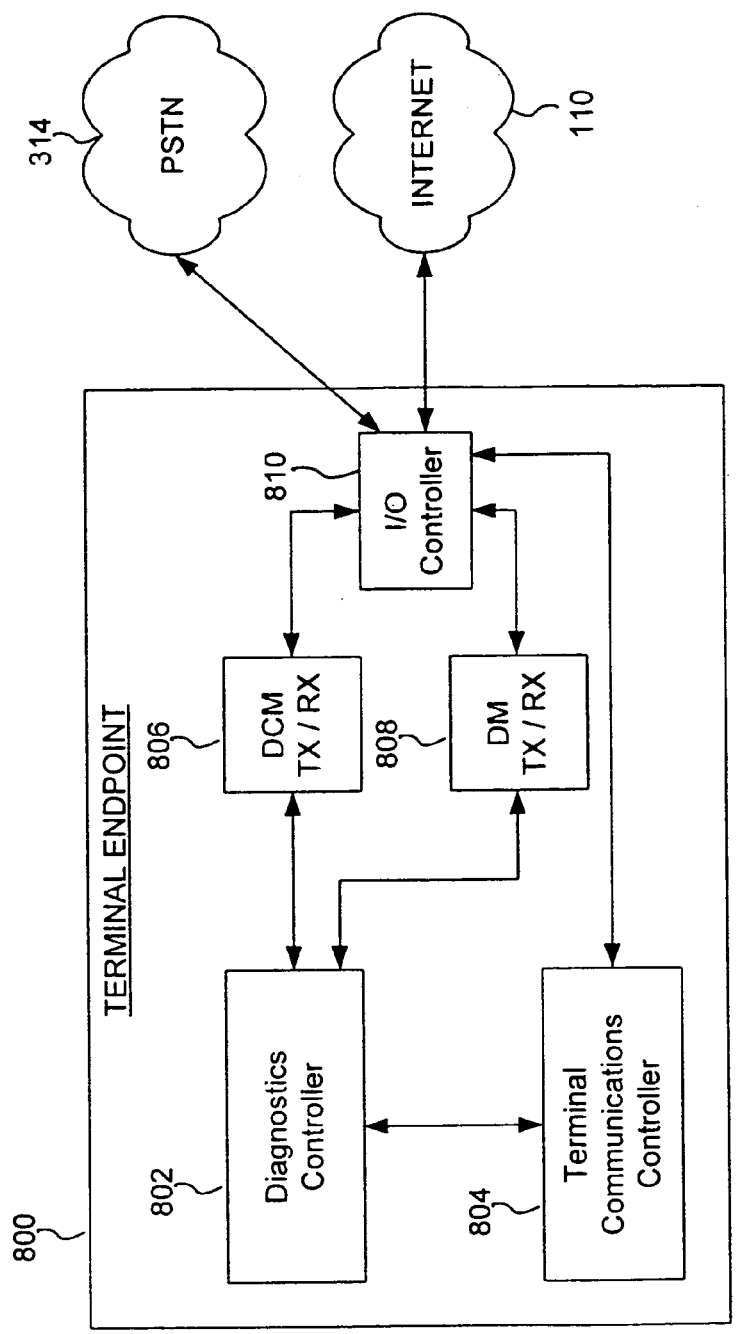
FIG. 8 illustrates an exemplary architecture of a TE according to an embodiment of the system and method of the invention.

FIG. 8 illustrates an exemplary architecture for a terminal endpoint (TE) 800 according to the present invention. The TE 800 includes a Diagnostics Controller 802, a Terminal Communications Controller 804, a DCM Transceiver 806, a DM Transceiver 808, and an I/O Controller 810.

The Diagnostics Controller 802 receives and transmits DCMs via DCM Transceiver 806. The Diagnostics Controller 802 is configured using DCMs received from one or more Diagnostic Supervisors 108. The Diagnostics Controller 802 monitors IP and PSTN transmissions by communicating with the Terminal Communications Controller 804. The Diagnostics Controller 802 receives diagnostic information regarding IP transmissions from a network manager module (not shown), such as that provided by Telogy Networks and described by GOLDEN GATEWAY® Interface, User Guide Version 2.5 for Release 5.1 (Telogy Networks, Germantown, Md.).

The Diagnostics Controller 802 formats DMs to be transmitted to the Diagnostic Supervisor 108 according to the information element format described above in connection with Table 2. The setting of parameters and transmission of DMs is determined by the Diagnostics Controller 802 according to DCMs received by the DS 108, according to the information element format described above in connection with Table 1. The DM Transceiver 808 transfers DMs prepared by Diagnostics Controller 802 to one or more DSs 108 or other TEs. Additionally, DM Transceiver 808 receives DMs from other TEs in the event that the TE 800 includes distributed DS functionality or can otherwise act on DM information from a far end IP or PSTN transmission. DCMs and DMs are transmitted and received via the I/O Controller 810 to/from the Internet 110 or PSTN 314.

The Terminal Communications Controller 804 of the terminal end point 800 performs voice, modem, facsimile, video and data transmissions with other TEs connected to either the Internet 110 or PSTN 314, as would be apparent to a person skilled in the art. An example communication protocol stack used by the Terminal Communication Controller 804 is the H.323 Protocol Stack manufactured by RADVision Inc. (Mahwah, N.J.).

As discussed above, providing diagnostic information concerning TEs IP and/or PSTN transmissions is very useful. For example, an Internet transmission, such as a VoIP call, can be rerouted from the Internet to the PSTN for a variety of reasons, some of which are triggered by diagnostic information. FIGS. 9A–9C illustrate exemplary flow diagrams of IP transmission routing to the PSTN according to the present invention. The progress of transmissions between communication devices illustrated in these diagrams advances in time from top to bottom, as shown at the arrows labeled "t".

FIG. 9A illustrates rerouting of an IP transmission between terminal endpoints TE1 and TE2. The IP transmission, such as a VoIP call, between TE1 and TE2 is shown generally at 902. During their IP transmission either TE1 and/or TE2 will send Diagnostic Messages (DM) to the Diagnostic Supervisor (DS) as shown generally at 904. Diagnostic information can also be sent before and after the connection and/or transmission is established. In this embodiment, the DS will evaluate the diagnostic information provided by the DMs and determine whether or not to reroute the IP transmission between TE1 and TE2 from the Internet to the PSTN. If the DS determines that rerouting is necessary, the DS will send an alert to both TEs, as shown generally at 906. Beeps or other notification can be provided to the user to audibly alert that the transmission will be rerouted to the PSTN. The communications controllers of both TEs will then handle rerouting of the call from the Internet to the PSTN, as shown generally at 908. Once rerouting is completed, the TEs will transmit reroute acknowledge signals (ACK) or not acknowledge (NACK) signals back to the Diagnostic Supervisor 108 indicating whether or not the rerouting to the PSTN was successful, as shown generally at 910.

FIG. 9B illustrates an alternative embodiment of the present invention for rerouting IP transmissions to the PSTN. In this embodiment, TE1 also has diagnostic supervision functionality. An IP transmission over the Internet between DS/TE1 and TE2 is shown generally at 912. TE2 transmits DMs to DS/TE2 during the IP transmission, as shown generally at 914. DS\TE1 also will internally monitor diagnostic information at its end of the IP transmission, as shown generally at 916. If DS\TE1 determines that rerouting is necessary it will send an alert to TE2, as shown generally at 918. The IP transmission will then be rerouted to the PSTN as shown generally at 920. An ACK or NACK signal will be sent by TE2 to verify whether or not the rerouting was effective on its end of the transmission, as shown generally at 922.

FIG. 9C shows yet another alternative embodiment for rerouting IP transmissions to the PSTN in accordance with the system and method of the invention. In this embodiment, both TE1 and TE2 have diagnostic supervision capabilities. An IP transmission between DS\TE1 and DS\TE2 is shown generally at 924. The two DS/TEs transmit DMs to each other during the IP transmission, as shown generally at 926. An alert will be sent by DS\TE1 or DS\TE2 in the event that a determination to reroute the IP transmission has been made, as shown generally at 928. Rerouting of the transmission to the PSTN and acknowledgment are shown at 930 and 932, respectfully. In this embodiment a user can initiate rerouting to switch to the PSTN for any reason.

Figure 10:
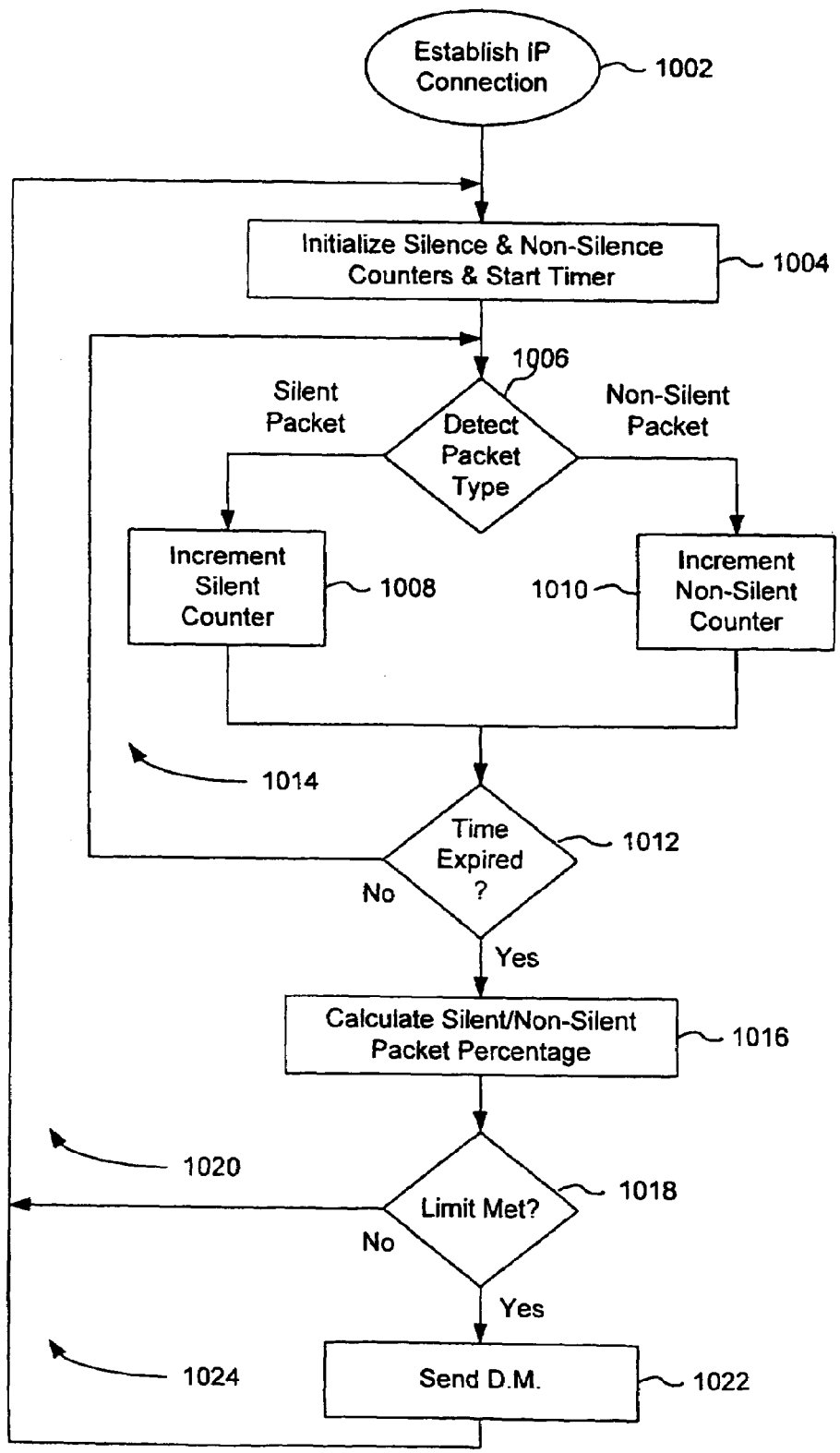
FIG. 10 illustrates an exemplary flow diagram for disconnect supervision or answer detection of IP transmissions according to embodiments of the system and method of the invention.

FIG. 10 illustrates an exemplary flow diagram for disconnect supervision and answer detection of IP transmissions according to embodiments of the present invention. As would be apparent to those skilled in the relevant art, disconnect supervision and answer detection are useful functions in communications systems. The adaptation of disconnect supervision and answer detection in an IP transmission environment will provide these features where they otherwise are not supported.

VoIP wrappers provide headers that specify whether the data portion of the packet is empty or not. If the data portion is empty, the packet is considered a silent packet. Non-silent packets followed by many silent packets may indicate the call has effectively terminated, perhaps abnormally. Thus, detection of silent packets can indicate that the call should be automatically disconnected. Many silent packets followed by non-silent packets can indicate the call has been answered. As listed above in Tables 1 and 2, the DCM and DM protocols support configuration of and reporting of diagnostic information concerning silent and non-silent packets. The reporting of silent packets can be used to implement disconnect supervision in an IP/PSTN gateway connection environment. In a similar fashion, the detection of non-silent packets can be used to implement answer detection in an IP/PSTN gateway connection.

According to the present invention, silent and non-silent detection can occur once an IP transmission is initiated between two or more TEs, as shown at a step 1002. A silence counter and non-silence counter, as well as a start timer, are initialized at a step 1004. Detection of either silent packets or non-silent packets is performed at a step 1006. If a silent packet is detected, the silent counter is incremented, as shown at a step 1008. Similarly, if a non-silent packet is detected, the non-silent counter is implemented at a step 1010. If a predetermined limit of the timer has not expired, as detected at a step 1012, silent and non-silent packet detection is continued, as shown generally at a loop 1014. If the timer limit has expired, the silent packet percentage or non-silent package percentage is calculated at a step 1016.

Predetermined limits for non-silent packet percentage and non-silent-packet percentage are set a priori, i.e., as a matter of deduction, by a DCM in order to determine, in the case of the silent packet percentage limit, whether a disconnection has occurred. Alternatively, if the predetermined non-silent packet percentage limit has been met, then answer detection has been determined. These limits are checked at a step 1018. If a limit is not met and the timer period has expired, the counters and start timer are reinitialized and the detection process continues, as shown generally at a loop 1020. If a limit has been met, the TE detecting the limit will send a DM to the Diagnostic Supervisor (DS), as shown at a step 1022. The detection process will then continue as shown generally at a loop 1024.

Calculating the percentage of total packets is a straightforward process. Total percentage of silent packets is simply the total number of silent packets divided by the sum of the total number of silent and non-silent packets. Similarly, the percentage of non-silent packets is the total number of non-silent packets divided by the sum of the total number of silent packets and non-silent packets. Rather than calculating the average packet count, the process can be simplified by simply counting the total number of silent or non-silent packets over a finite period of time.

In an alternative embodiment of the present invention, DCM configuration information can be preprogrammed at installation. In this manner TEs are hard-coded to transmit DMs that include diagnostic information of parameters without the need to be actively configured by DCMs. For example, TEs would automatically, e.g., at predetermined time intervals, transmit DMs with silent and non-silent diagnostic information during all or only preprogrammed types of transmissions.

Figure 11:
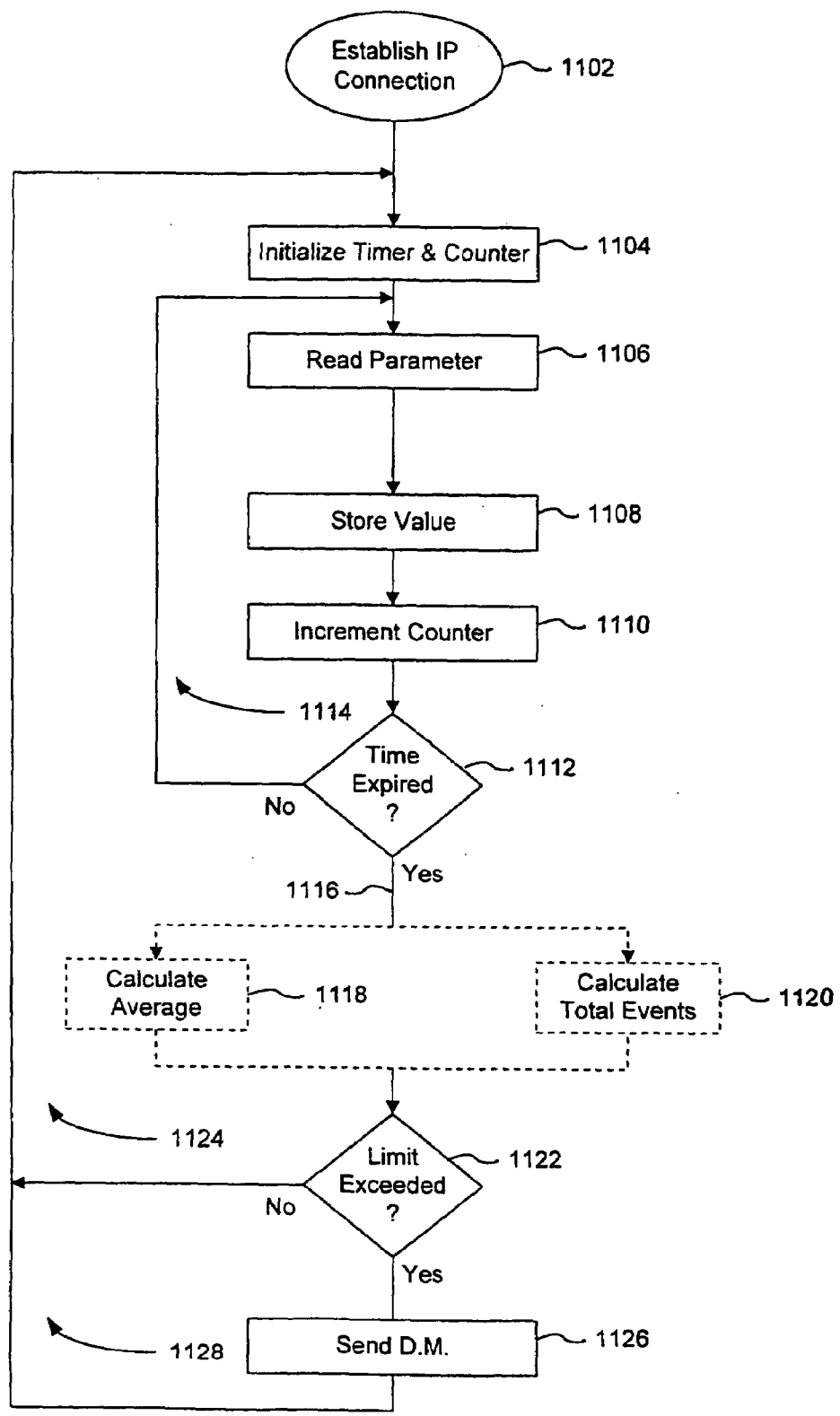
FIG. 11 illustrates an exemplary flow diagram for monitoring parameters of IP transmissions according to further embodiments of the system and method of the invention.

FIG. 11 illustrates an exemplary flow diagram for monitoring parameters of IP transmissions according to the present invention. In addition to silent and non-silent packet detection, other diagnostic parameters can also be monitored on an average or total event approach. The flow diagram of FIG. 11 illustrates both approaches. Parameters that can be measured according to an average packet count include jitter and playout delay. Parameters that can be monitored on a total event basis include the number of packets, dropped packets, invalid header packets, micro-overflow, missing payload, and lost packets that were replaced by preceding packets. As would be apparent to one skilled in the relevant art, these listed parameters are provided by way of example and not limitation.

The detection of diagnostic parameters begins once an IP transmission is established, as shown at step 1102. A timer and counter are initialized in a step 1104. The parameter being monitored is read at a step 1106 and its value stored at a step 1108. Then, the counter is incremented at step 1110. If the time limit has not expired at a step 1112, monitoring continues as shown generally at a loop 1114. If time has expired at a step 1116, either the average is calculated at step 1118 or the total is calculated at a step 1120. If a predetermined average or total event limit is not exceeded at a step 1122, the timer and counter are simply re-initialized and the process continues, as shown generally at a loop 1124. If an average or total event limit is exceeded, then the TE performing the detection of diagnostic parameters transmits a DM to the DS, or other device as configured by the DCM, as shown at a step 1126. The detection process continues for the parameter of interest as shown generally at a loop 1128.

The detection/monitoring of diagnostic parameters can be performed by one or more TEs involved in an IP transmission. Any given TE can perform diagnostic parameter detection/monitoring for any given parameter. The type of calculation including an average or total count, for example, and the time and total count limits are set according to the network administrator via DCMs, as described above in connection with Table 1.

Figure 12:
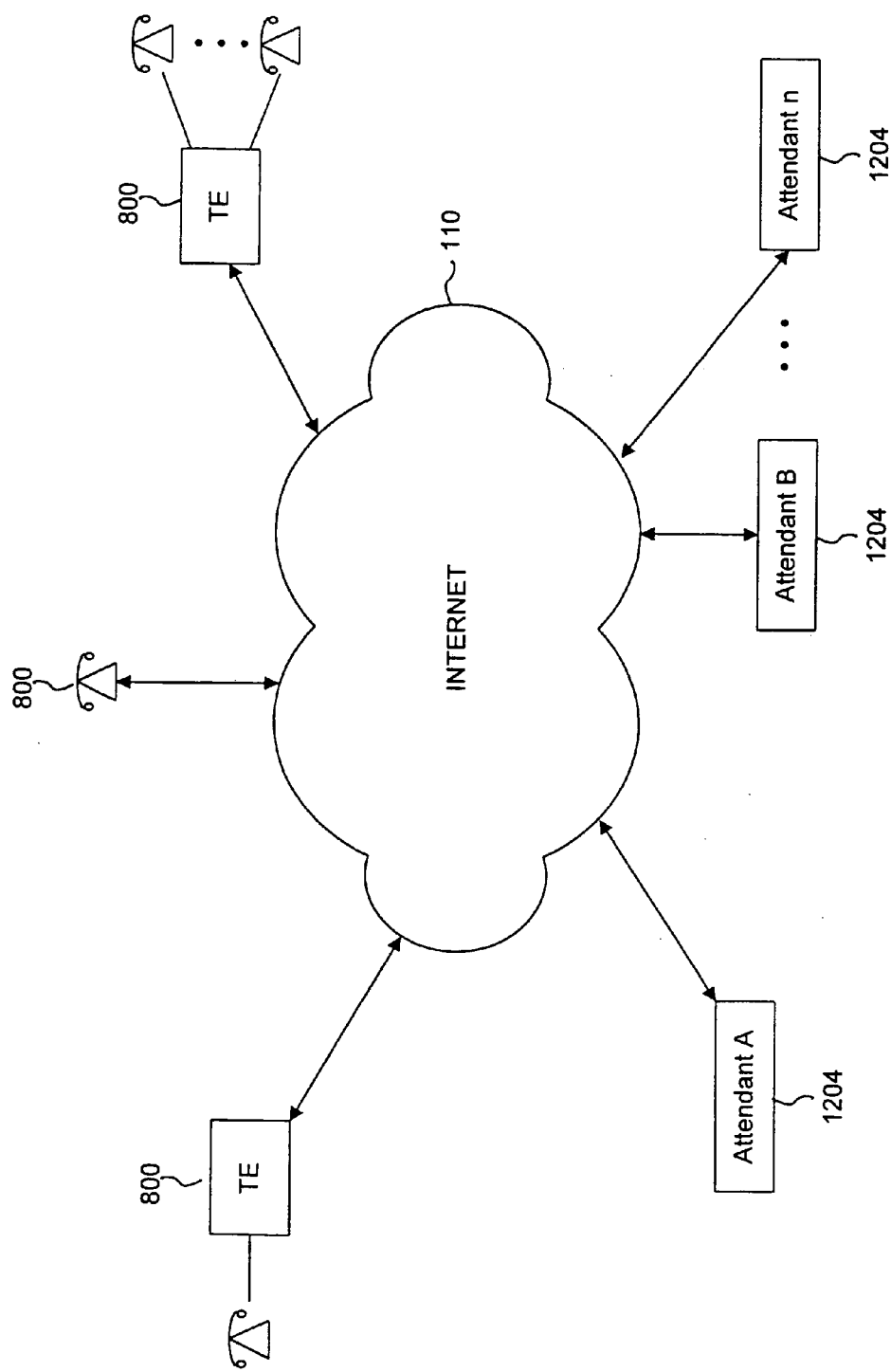
FIG. 12 illustrates various types of TEs in a system for attendant supervision of IP transmissions according to an embodiment of the system and method of the invention.

Another embodiment of the present invention taking advantage of diagnostic information is called "attendant supervision." FIG. 12 illustrates various types of TEs in a system for attendant supervision of IP transmissions according to the present invention. FIG. 12 illustrates various TEs at 800. These TEs can take on various configurations as discussed above in connection with FIG. 2. The TEs communicate via the Internet 110. In this embodiment, one or more attendants (A, B through n) are shown at 1204. TEs 800 and one or more attendants 1204 comprise a communications network. At an attendant 1204, a human operator, which may also be characterized as an "attendant," can monitor IP transmissions by the TEs 800.

Using an information element format similar to those described above in connection with the DCMs and DMs listed in Tables 1 and 2, an attendant 1204 can function as a diagnostic supervisor to provide real-time connection supervision. For example, diagnostic information can be provided to an attendant 1204 concerning whether a user at a TE is currently on the phone and unable to take an incoming call. Based on this information the attendant 1204 can answer the incoming call and alert the caller that the TE is currently on another call, or is otherwise generally unavailable. Alternatively, diagnostic information can be transmitted to the attendant 1204 from a TE if that TE wishes to forward all incoming calls to the attendant 1204. In this manner the attendant 1204 can answer all forwarded calls intended for that TE. The attendant 1204 can view the status (call information) of network users on the screen of an attendant's computer, workstation, or on an intelligent IP phone, for example. The computer, workstation, or intelligent IP phone provides an interface for the attendant 1204 to monitor telephone network calls, or the like.

The one or more attendants 1204 are therefore capable of performing similar call functions that a operator of a communications system can perform. Although the communication network is comprised of TEs and attendants that are located at different geographical locations, call information can be sent to the attendant or attendants in the same manner that diagnostic information is transferred to the DS in the previously discussed embodiments.

Figure 13:
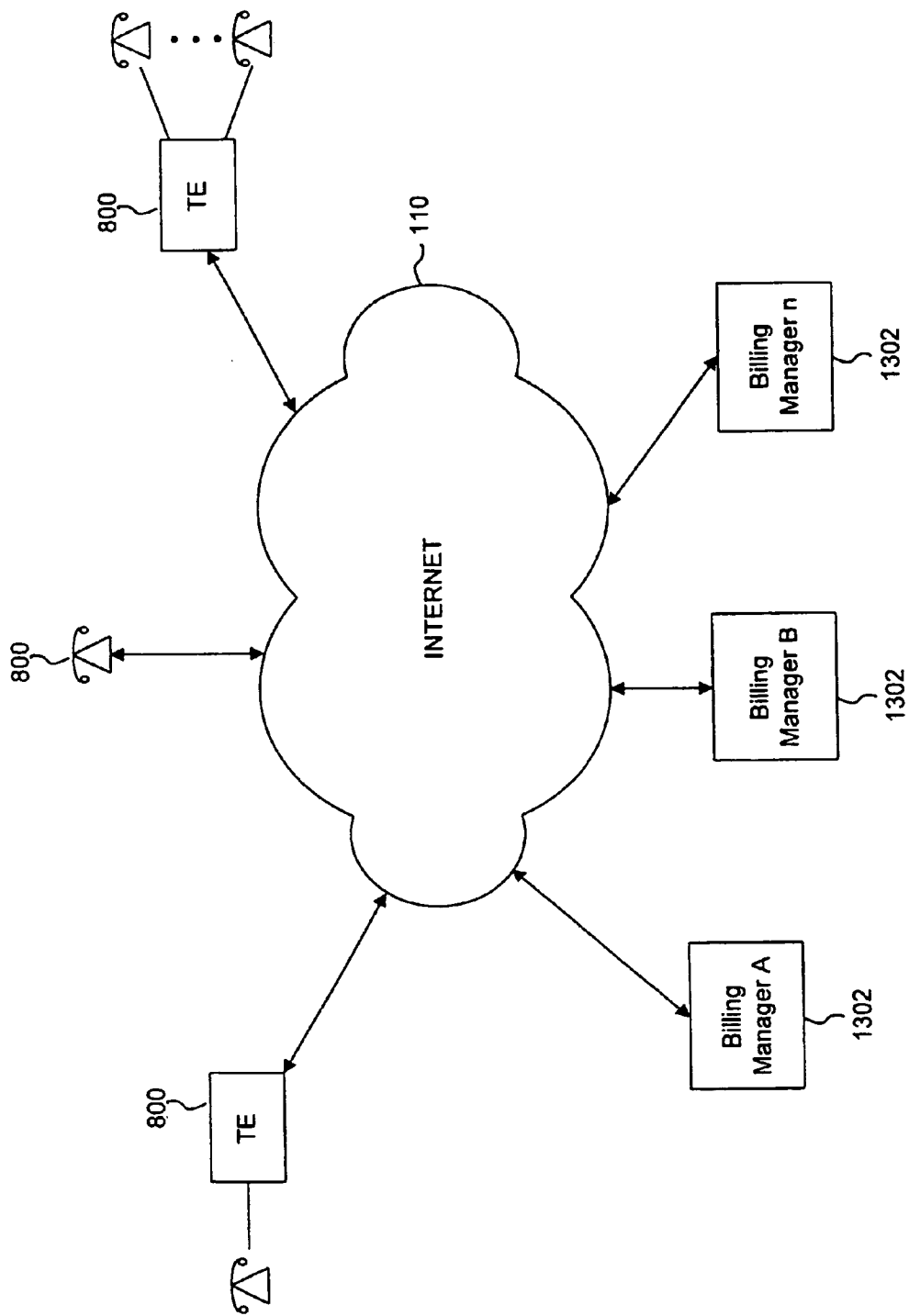
FIG. 13 illustrates various types of TEs in a system for billing management of IP transmissions according to an embodiment of the system and method of the invention.

In accordance with an aspect of the system and method of the invention, FIG. 13 illustrates various types of TEs in a system for billing management of Internet transmissions according to the present invention. In this embodiment, one or more billing managers (A, B through n) 1302 collect and process billing information for IP transmissions over the Internet 110 by the TEs 800. In a similar manner in which call information is provided to attendants 1204 in the embodiment shown in FIG. 12, a billing protocol can be established for transmitting billing information to the billing manager 1302. The billing protocol would comprise a similar syntax as the information element formats for DCMs and DMs as described above in connection with Tables 1 and 2. Billing for IP transmission services can be achieved in this manner.

Hereinafter, further aspects of the system and method of the invention will be described. In accordance with the system and method of the invention and as described above, the diagnostic information contained in the DMs may be used for a variety of purposes. One purpose is to determine when disconnect of a call is appropriate. Another purpose of the diagnostic information is to determine when reroute of the call over the PSTN is appropriate.

In accordance with further aspects of the system and method of the invention, the diagnostic information contained in the DMs may also be used to vary the characteristics of a VoIP transmission, for example. By varying the characteristics of the VoIP transmission, for example, the resulting internet transmission may be enhanced.

In an embodiment of the system and method of the invention, the Real-time Response Manager 406 includes a Packet Size Controller 710, as shown in FIG. 7 and described above. The Packet Size Controller 710 may vary the size of packets transmitted by the TEs. This adjustment in packet size is performed in response to diagnostic information obtained by the DS 108.

In further explanation, a reroute or disconnect of a call may be initiated by the DS 108 as a result of certain diagnostic information obtained from the TEs, as described above. However, the system and method of the invention are not limited to disconnecting or rerouting calls. Rather, in accordance with an embodiment of the system and method of the invention, the parameters of the Internet transmission may be varied based on the diagnostic information. In particular, the Packet Size Controller 710 in the DS may, for example, change the packet size of a transmission to improve the quality of service (QoS) of the transmission.

The Packet Size Controller 710 may utilize the additional DCMs 22–23 as shown in table 1, for example. Additionally, the Packet Size Controller 710 may monitor and vary packet size depending on DMs 24–27 generated by the TEs.

In accordance with the system and method of the invention, and as described above, a diagnostic message DM may be generated by the TEs when certain conditions are present in a transmission. Upon receiving a diagnostic message, the DS, for example, may communicate certain information to the Packet Size Controller 710. Based on this communicated information, the Packet Size Controller 710 may calculate a value which may be characterized as the quality of Service or (QoS) in accordance with the system and method of the invention.

It should be appreciated that the QoS of a transmission may be calculated in a variety of ways. However, in accordance with this embodiment of the invention, the QoS is calculated based on select information contained in the DM, which is received from each TEs. Specifically, the QoS from the perspective of a TE, i.e., a near-end TE, may be calculated according to the relationship:

$$\text{Quality of Service } (QoS) = (\xi_1 COL_n + \xi_2 PNU_n + \xi_3 JIT_n)$$
$$+ \beta_1(\xi_4 COL_1 + \xi_5 PNU_1 + \xi_6 JIT_1 + \xi_7 PLP_1)$$
$$+ \beta_2(\xi_4 COL_2 + \xi_5 PNU_2 + \xi_6 JIT_2 + \xi_7 PLP_2)$$
$$+ \beta_j(\xi_4 COL_j + \xi_5 PNU_j + \xi_6 JIT_j + \xi_7 PLP_j) + CONST\langle^{-1}; \qquad \text{Eq. (1)}$$

wherein equation 1 includes the variables:

QoS=quality of service of the call in relation to a near-end party;

$COL_n$=number of collisions at near-end of call over a predetermined period of time;

$COL_i$=number of collisions at "i"th far-end party over a predetermined period of time for i=1→j;

$PNU_n$=percent (%) of time network is used at near-end, i.e., the percent of total time a carrier is detected;

$PNU_i$=percent (%) of time network is used at "i"th far-end party for i=1→j.

$JIT_n$=average jitter at near-end;
$JIT_i$=average jitter at "i"th far-end party for i=1→j; and
$PLP_i$=percent (%) of lost packets at "i"th far-end party for i=1→j;

Additionally, equation 1 includes the coefficients:

$\epsilon_p$=the weight assigned to the respective transmission properties for p=1→7;

$\beta_q$=the weight assigned to each respective caller for q=1→j; and

CONST=a constant that limits the value of QoS if all the transmission properties are zero.

Equation 1 defines the QoS of an Internet transmission from the perspective of a TE. As shown in equation 1, it should be appreciated that the equation includes coefficients $\xi_p$ and $\beta_q$ associated with the variables. In accordance with the system and method of the invention, these coefficients may be changed to effect the weighting of the variables. This adjustment of the coefficients $\xi_p$ and $\beta_q$ may be performed automatically, in response to certain conditions being present. Alternatively, the coefficients $\xi_p$ and $\beta_q$ may simply be changed by a user, for example.

Illustratively, the particular situation may require that the number of collisions and the jitter should not be considered in the calculation of the QoS. As a result, the coefficients $\xi_4$ and $\xi_6$ in equation 1 would be set to zero.

As should be appreciated, the factors of equation 1 may possess any of a wide variety of units. The particular units used for any one factor are not critical. However, it is necessary that the units of any one factor be used consistently. Further, it should be appreciated that the units of any one factor will effect the weighting of that factor, and that this should be taken into account.

Additionally, it should be appreciated that the coefficients $\xi_p$ may be varied to appropriately weight the various diagnostic variables. For example, the nature of the Internet transmission may require that packet loss is kept to an absolute minimum, but that the amount of jitter in the transmission is of minimal importance. As a result, values may be assigned such that $\xi_7=1$ and $\xi_6=0.2$. In this manner, equation 1 may be weighted.

Equation 1 also provides for the presence of "j" number of terminal endpoints with respect to a near-end party. Specifically, the coefficient $\beta_q$ for q=1→j may be used to give a "far end" terminal endpoint (TE) no weight, i.e., that TE does not exist, or alternatively, some other appropriate weighting. Accordingly, if each of the far-end TEs are considered equally important, for example, then each of the coefficients $\beta_q$ might be assigned a value "1". Alternatively, communication with the first far-end terminal endpoint may be of high importance and communication with the seventh far-end terminal endpoint may be of minimum importance. Accordingly, assuming a total of seven TEs, the coefficients $\beta_q$ may be assigned as follows, for example:

$\beta_1$=2.0;
$\beta_2$=1.0;
$\beta_3$=1.0;
$\beta_4$=1.0;
$\beta_5$=1.0;
$\beta_6$=1.0; and
$\beta_7$=0.2.

As a result of the manner in which equation 1 is formulated, it is apparent that as the quality of service increases, i.e., the transmission of the call is enhanced, the value of the QoS increases. The "thresholds" as described below are based on this formulation. However, it should be appreciated by one of ordinary skill in the art that equation 1 might be formulated in a different manner to result in the variable "QoS" decreasing as the quality of the Internet transmission is enhanced, for example. If using this re-formulation, it would be appropriate to re-characterize the QoS as an "Inverse QoS."

Accordingly, it should be appreciated that equation 1 is highly adaptable to monitor the quality of service (QoS) of an Internet transmission in a wide variety of situations. Further, it should be appreciated that while equation 1 includes the parameters such as collisions and lost packets, other diagnostic parameters not included in equation 1 above may be utilized to determine the QoS. These additional diagnostic parameters may include any of the other diagnostic parameters in Table 2 above, as well as others.

The quality of service (QoS) as illustratively defined in equation 1 may be utilized to adapt the parameters of Internet transmissions based on diagnostic information. This adjustment of the Internet transmission parameters may be performed in real-time. In particular, in accordance with an embodiment of the system and method of the invention, the DS or a TE may utilize the QoS to adjust the packet size, change the data value of the codec, switch to PSTN connection, or disconnect the call, for example. These adjustments are performed by comparing the QoS with respective threshold values, as described below. For example, if a QoS value is low enough, i.e., if the quality of the call is poor to a predetermined degree, then the call may be disconnected.

A predetermined threshold may be determined for each respective parameter. These thresholds may be characterized as:

QoS_Packet_Threshold=minimum level of QoS which will not result in an increase in packet size;

QoS_Codec_Threshold=minimum level of QoS which will not result in a codec change;

QoS_PSTN_Threshold=minimum level of QoS which will not result in a switch to the PSTN; and QoS_Disconnect_Threshold=minimum level of QoS which will not result in a termination of the call with respect to a TE.

Further, these thresholds may be arranged accordingly to a hierarchy. Illustratively, the values may be designated such that:

QoS_Packet_Threshold≧QoS_Codec_Threshold;
QoS_Codec_Threshold≧QoS_PSTN_Threshold; and
QoS_PSTN_Threshold≧QoS_Disconnect. Threshold.

Thus, the QoS_Packet_Threshold is higher than the QoS_Disconnect_Threshold. As a result, the packet size will be adjusted at a higher QoS, as compared with a QoS that will justify a call disconnect. The hierarchy may be adjusted by changing the threshold values. The hierarchy may be adjusted based on the attributes associated with each threshold. For example, an adjustment of the packet size is a relatively minor change as compared with a disconnect of the call. As a result, the QoS will necessarily have to be much lower, i.e., the quality of the Internet transmission much poorer, to justify a call disconnect as compared with an adjustment of the packet size. The particular hierarchy utilized may be varied depending on a wide variety of factors.

Accordingly, if the QoS is high enough, then no changes may be made in an attempt to further improve the quality of the Internet transmission. However, if the QoS is not good enough, i.e., not above a minimum threshold, then the packet size might be increased to further enhance the Internet transmission.

As described above, FIG. 7 is a diagram showing a RTRM 406 that includes a Packet Size Controller 710. In accordance with an embodiment of the system and method of the invention, the RTRM 406 waits for a diagnostic message (DM) from the TEs. Once a diagnostic message is received, the Packet Size Controller 710 calculates the QoS based on equation 1, for example. Then, the Packet Size Controller 710 compares the QoS with the QoS_Packet_Threshold value. The QoS_Packet_Threshold may be calculated at any appropriate time during or after an Internet transmission. That is, the QoS might be stored in order to be used in connection with some subsequent Internet transmission. Illustratively, the QoS_Packet_Threshold may be stored in any well known storage device.

The Packet Size Controller 710 takes various steps depending on the relationship between the QoS and the QoS_Packet_Threshold. Specifically, the QoS, a measured value, may be greater than the QoS_Packet_Threshold, a predetermined value. This relationship indicates that the QoS of the transmission is higher than acceptable.

It should be appreciated that certain benefits are associated with decreasing the packet size. For example, the transmission speed is enhanced. As a result, if the Packet Size Controller 710 observes that the QoS is greater than the QoS_Packet_Threshold, then the Packet Size Controller 710 may try to decrease the packet size, even though the Packet Size Controller 710 received a DM, as described further below. This adjustment will result in a possible increase in the quality of the transmission.

Subsequent to decreasing the packet size, the Packet Size Controller 710 will wait to determine if a new diagnostic message is received. If a new diagnostic message is not received, then the Packet Size Controller 710 will continue to wait using a looping process, for example, as is deemed suitable. Alternatively, the Packet Size Controller 710 may receive a new diagnostic message. If the Packet Size Controller 710 receives a new diagnostic message, then the Packet Size Controller 710 implements further processing to determine the effect of the increase in packet size, as described below.

However, it should be appreciated that the quality of service (QoS) may be less than the QoS_Packet_Threshold. This relationship indicates that the QoS is less than acceptable. In an attempt to address this deficiency, the Packet Size Controller 710 will increase the packet size. Subsequent to increasing the packet size, the RTRM 406 waits to determine if a new diagnostic message is received. If a new diagnostic is received, the Packet Size Controller 710 performs further processing to determine the effect of the increase in packet size.

A decrease in the packet size will now be described in further detail. As described above, if the QoS is greater than the QoS_Packet_Threshold, then the Packet Size Controller 710 attempts to decrease the packet size. However, it should be appreciated that the packet size cannot be decreased arbitrarily. To explain, any of a wide variety of codecs may be utilized in an Internet transmission. As a result, it is necessary to determine the specific codec type being utilized and the operating specifications of that codec or codecs.

That is, the Packet Size Controller 710 will determine if there is a packet size, which may be utilized with the codec type, which is smaller than the current packet size. If the codec is operative with a smaller packet size, then the Packet Size Controller 710 will reduce or decrease the packet size to the next available smaller packet size. Then, in accordance with an embodiment of the invention, the Packet Size Controller 710 will undergo a time delay in which the Packet Size Controller 710 will wait for a further diagnostic message to be received.

Alternatively, the Packet Size Controller 710 may determine that no smaller packet size is available. If no smaller packet size is available, then the RTRM 406 will simply wait to determine if a further diagnostic message is received. That is, the problem that caused the DM to be sent may be addressed by some other event or diagnostic correction process.

As described above, the Packet Size Controller 710 may determine that the QoS is less than the QoS_Packet_Threshold. This indicates that the quality of the transmission is not acceptable. The Packet Size Controller 710 will respond to the unacceptable quality of service by increasing the packet size if possible.

As described above, the packet size cannot be decreased arbitrarily. Similarly, the packet size cannot be increased arbitrarily. Accordingly, it is necessary to determine the specific codec type being utilized and the operating specifications of that codec or codecs.

That is, the Packet Size Controller 710 will determine if there is a larger packet size which may be utilized with the codec type, i.e., a packet size which is larger than the current packet size. If the codec is operative with a larger packet size, then the Packet Size Controller 710 will save the current QoS, i.e., the observed QoS, prior to increasing the packet size. By saving the QoS, the Packet Size Controller 710 is allowed to make quality of service comparisons subsequent to changing the packet size.

Alternatively, combining several voice information frames (VIFs) or voice payload packets into one UDP packet may increase the packet size. Increasing packet size can reduce the percentage of loss packets in a congested environment by reducing the number of times it is required to capture the right to transmit in the collision avoidance carry detect process of Ethernet. However, increased packet size can increase delay.

After saving the QoS, the Packet Size Controller 710 will increase the packet size to the next available larger packet size. Then, in accordance with an embodiment of the invention, the Packet Size Controller 710 will undergo a time delay in which the Packet Size Controller 710 will wait for a further diagnostic message to be received.

Alternatively, the Packet Size Controller 710 may determine that no larger packet size is available. If no larger packet size is available, then the RTRM 406 will simply wait to determine if a further diagnostic message is received. That is, the diagnostic problem may be addressed by some other event or diagnostic correction process.

As described above, the Packet Size Controller 710 increases the packet size if the observed QoS is less than the QoS_Packet_Threshold. As also described above, the Packet Size Controller 710 saves the observed QoS prior to increasing the packet size. The Packet Size Controller 710 then waits to determine whether a further diagnostic message is received from the TE, for example.

If a new diagnostic message is not received in a certain period of time, then the RTRM 406 in effect assumes that increasing the packet size addressed the deficiency that caused the diagnostic message (DM). As a result, the RTRM 406 simply waits for a further DM. However, if the further DM is not received in the predetermined period of time. Then the RTRM 406 will assume that the subsequent DM is unrelated to the increase in packet size. As a result, the RTRM 406 will reinitiate the process performed by the Packet Size Controller 710, i.e., calculating a new QoS and comparing the new QoS with the QoS_Packet_Threshold.

Alternatively, the RTRM 406 may receive a further DM within the predetermined period of time, i.e., within a short enough time to assume that there is a relationship between the further DM and the change in packet size. In this situation, the Packet Size Controller 710 performs processing to determine the effect in the increase in packet size.

Specifically, the 170 determines if the enlargement of the packet size was useful in increasing the QoS of the transmission. To make this determination, the Packet Size Controller 710 re-calculates the QoS. The Packet Size Controller 710 then compares the re-calculated $QoS_{j+1}$ with the $QoS_j$ calculated before the increase in packet size in accordance with the system and method of the invention. This comparison may be performed in any suitable manner.

Illustratively, this comparison may be performed using the relationship:

$$Diff\_QoS = (QoS_{j+1} - QoS_j) + \epsilon, \quad \text{Equation 2}$$

wherein:

Diff_QoS is the adjusted difference between the QoS before and after the increase in packet size;

$QoS_{j+1}$ is the QoS after the increase in packet size;

$QoS_j$ is the QoS before the increase in packet size; and $\epsilon$ is a predetermined adjustment factor, which may be a positive or negative value.

Equation 2 provides a quantitative relationship between the values of $QoS_{j+1}$ and $QoS_j$. Specifically, equation 2 relies upon the difference between $QoS_{j+1}$ and $QoS_j$. The adjustment factor $\epsilon$ allows a user to adjust this difference. As the value of $\epsilon$ increases, the value of $QoS_{j+1}$ is effectively given a higher weighting. In contrast, as the value of $\epsilon$ decreases, the value of $QoS_{j+1}$ is effectively given a lower weighting.

In accordance with an embodiment of the system and method of the invention, the Packet Size Controller 710 compares the value of DIFF_QoS with the value 0 (zero). If DIFF_QoS$\geq$0, then the increase in packet size is deemed effective. Thus, the Packet Size Controller 710 maintains the increased packet size. In contrast, if DIFF_QoS<0, then the increase in packet size was not effective.

If the Packet Size Controller 710 determines that the increase in packet size was not effective to enhance the QoS, then the Packet Size Controller 710 will take appropriate measures. As described above, it is generally not beneficial to increase the packet size. Accordingly, if the Packet Size Controller 710 determines that the increase of packet size did not enhance the quality of service of the Internet transmission, then the Packet Size Controller 710 changes the packet size back to the previous packet size. Additionally, since the change in packet size was not effective in addressing the unacceptable QoS, then the Packet Size Controller 710 may take other measures in accordance with the system and method of the invention, as described below.

In further explanation, as the value $\epsilon$ increases, a lower value of $QoS_{j+1}$ is required to maintain the increased packet size, i.e., to justify the increased packet size. Further, if a user assigns $\epsilon$ a negative value, the user is in effect mandating that $QoS_{j+1}$ be better than the $QoS_j$ by an amount $\epsilon$, else the increased packet size will not be maintained.

Equation 2 above utilizes the difference between $QoS_{j+1}$ and $QoS_j$. However, it should be appreciated that any appropriate relationship may be utilized to determine if the increase in packet size was effective in enhancing the QoS. For example, rather than determining the difference between the two quality of services ($QoS_{j+1}$ and $QoS_j$), the value $QoS_{j+1}$ may be divided by $(QoS_j)+\epsilon$. The resulting quotient could then be compared with unity, i.e., the value one, to determine if the increase in packet size was effective.

As described above, the Packet Size Controller 710 may determine that the increase in packet size did not remedy the diagnostic problem identified by the DM. Accordingly, the Packet Size Controller 710 returns the packet size back to the previous packet size. The RTRM 406 then initiates further processing to address the problem identified by the DM.

Specifically, the RTRM 406 may attempt to change the codec utilized by the callers to enhance the QoS. To initiate a possible codec change, the RTRM 406 utilizes equation 1 above to again calculate and save in memory a quality of service, $QoS_{i+1}$. The RTRM 406 then compares $QoS_{i+1}$ with a value QoS_Codec_Threshold. The QoS_Codec_Threshold is a predetermined value, which defines a QoS value at which the quality is poor enough to justify a change in the codec. Thus, if the QoS is less than the QoS_Codec_Threshold value, then the RTRM 406 determines whether there is a lower data value codec available for all the callers involved in the transmission.

If the RTRM 406 determines that a lower data value codec is available for all-callers, then the RTRM 406 will change the codec utilized by all the callers. The RTRM 406 may notify the users prior to this change in codec. Then, the RTRM 406 utilizes a time delay and waits for a new DM. If a further DM is not received, then the RTRM 406 assumes that the problem was solved and the process is terminated and not reinitiated until a further DM is received.

Alternatively, if a DM is received within a predetermined period of time, then the RTRM 406 concludes that the change in codec was not effective in addressing the problem. In response, the RTRM 406 may retrieve the value $QoS_{i+1}$, which was determined before the codec was changed. The RTRM 406 then compares the value $QoS_{i+1}$ with a recalculated codec value, using an adjustment factor if necessary or desirable. If the codec change did not improve the QoS, then the RTRM 406 may change the codec back to the original codec. The RTRM 406 then waits for a further diagnostic message.

Alternatively, even though a further DM is received, the change in the codec may have improved the QoS. In this situation, the RTRM 406 may again determine whether the QoS is greater than the QoS_Codec_Threshold. If it is, i.e., the transmission is poorer than the threshold, then the RTRM 406 may again determine if a lower data value CODEC is available for all the callers. If so, then the RTRM 406 may effect a change to that lower value codec.

Illustratively, the lowest data value codec may still not result in a transmission possessing sufficient QoS. In this situation, the RTRM 406 will perform further processing to cure the deficiency. In particular, the RTRM 406 will determine if a switch to the PSTN is appropriate.

That is, the RTRM 406 will again determine a value for the quality of service $QoS_{j+2}$ using equation 1 above. The value of $QoS_{j+2}$ may be compared with a predetermined value QoS_PSTN_Threshold. If the $QoS_{j+2}$ is greater than the QoS_PSTN_Threshold, this relationship is indicative that the call should not be switched to the public switched telephone network (PSTN). Thus, while the QoS is less than desirable, the QoS is not poor enough to switch to the PSTN.

If the $QoS_{j+2}$ is less than the QoS_PSTN_Threshold, this relationship is indicative that the call should be switched to the public switched telephone network (PSTN). As a result, the RTRM 406 first determines if a reroute of the call is even possible. If the RTRM 406 determines that the call may be rerouted using the PSTN, then the RTRM 406 will first notify the user of the reroute. Any suitable manner may be used to advise the user of the reroute. After, notifying the user, the RTRM 406 proceeds with rerouting the call. Then the RTRM 406 waits to see if a further DM is received.

If the RTRM 406 determines that a reroute of the call is not possible, then the RTRM 406 performs further processing to determine if disconnect of the call is appropriate. That is, the RTRM 406 will again determine a value for the quality of service $QoS_{i+3}$ using equation 1 above. The value of $QoS_{i+3}$ may be compared with a predetermined value QoS_Disconnect_Threshold. If the $QoS_{i+3}$ is greater than the QoS_Disconnect_Threshold, then the quality of service is poor enough to justify disconnection of the call. As a result, the RTRM 406 will first notify the users of a pending call disconnect. This notification may be performed in any suitable manner, such as displaying a message on the phone showing a pending call disconnect. Subsequent to the notification to the users, the RTRM 406 will perform disconnect of the call.

In accordance with the system and method of the invention, the RTRM 406 determines the QoS at various stages in the process as described above. Based on the QoS, the RTRM 406, including the RTRM 406, performs processing with the objective of enhancing the QoS and the quality of the call. In accordance with the system and method of the invention as described above, various thresholds and operations are utilized in what may appear to be a specific order. For example, the Packet Size Controller 710 determines whether it is appropriate to adjust the packet size, after which the RTRM 406 determines whether a call disconnect is appropriate.

However, it should be appreciated that the order of the various processes utilized to determine the efficient transmission of a call may be varied. Further, it should be recognized that a specific operation as described above may be omitted depending on the particular operating system or the particular application. For example, it may not be necessary or desirable to perform processing in order to determine whether a call disconnect is appropriate. Additionally, it should be appreciated that the waiting periods as described above may be varied depending on the particular use of the process.

Figure 14:
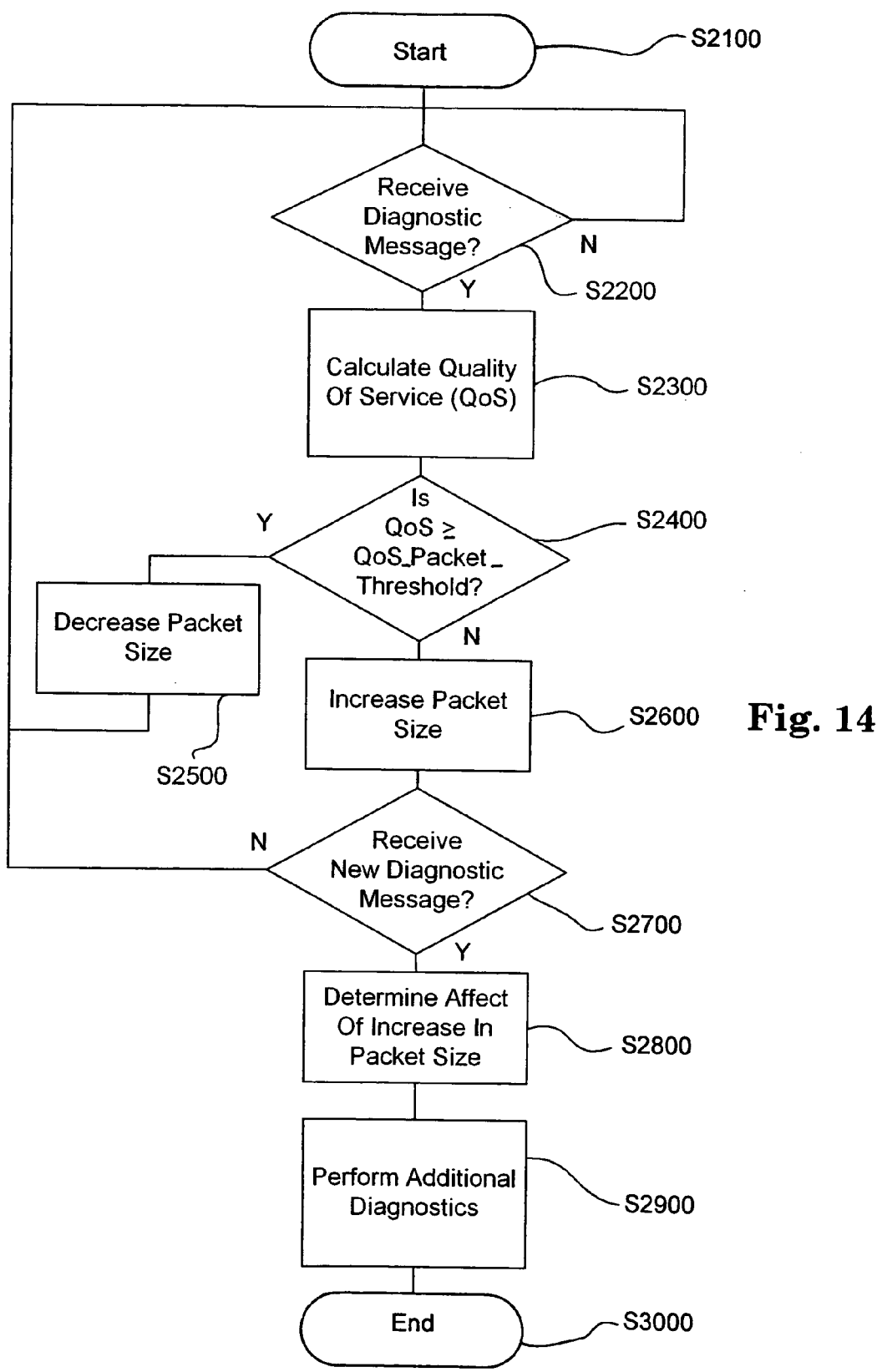
FIG. 14 illustrates an exemplary flow diagram showing utilization of a quality of service (QoS) value according to an embodiment of the system and method of the invention.

In accordance with the system and method of the invention, FIG. 14 is a flowchart illustrating further aspects relating to an embodiment of the invention. Specifically, FIG. 14 illustrates a process of diagnostic detection and resulting processing to enhance the QoS. The process is illustrated in FIG. 14, as well as FIGS. 15–20, may be performed utilizing the operating system as described above or another suitable operating system.

As shown in FIG. 14, the process starts in step S2100. After step S2100, the process passes to step S2200. In step S2200, a determination is made whether any diagnostic messages have been received. If no, then the process continuously loops through step S2200 until a diagnostic message is received.

However, if a diagnostic message has been received in step S2200, then the process passes to step S2300. In step S2300, the quality of service (QoS) is calculated. This calculation may be performed utilizing the quality of service calculation as described above, in equation 1. After step S2300, the process passes to step S2400. In step S2400, a determination is made whether $$QoS \geq QoS\_Packet\_Threshold.$$

If yes in step S2400, then the relationship of step S2400 is satisfied. That is, the quality of the transmission is better than the threshold value QoS_Packet_Threshold.

Since the QoS is better than acceptable, in accordance with the embodiment of the invention as shown in FIG. 14, the packet size is decreased to further enhance the transmission of the call. In this manner, the system and method of the invention optimize the transmission by varying the packet size. Specifically, a decrease in the packet size will improve the delay experienced in transmission of the packets. After decreasing the packet size, the process returns to step S2200 to wait for a possible further diagnostic message.

Alternatively, if QoS≧QoS_Packet_Threshold is not satisfied, then the process passes to step S2600. In step S2300, the packet size is adjusted in response to the diagnostic message. That is, in step S2600, the packet size is increased. Then the process passes to step S2700.

In step S2700, a determination is made whether a new diagnostic message is received. If no, then the increase in packet size may be assumed as effective in enhancing the transmission quality and the process returns to step S2200. Alternatively, if yes in step S2700, i.e., a new diagnostic message was received, then the increase in packet size was not effective in curing the problem, and the process passes to step S2800.

In step S2800, the effect of the increase in packet size is determined. Then the process moves to step S2900. In step S2900, additional diagnostics are performed in order to enhance the transmission and address the diagnostic messages. Then, the process moves to step S3000. In step S3000, the process ends.

Figure 15:
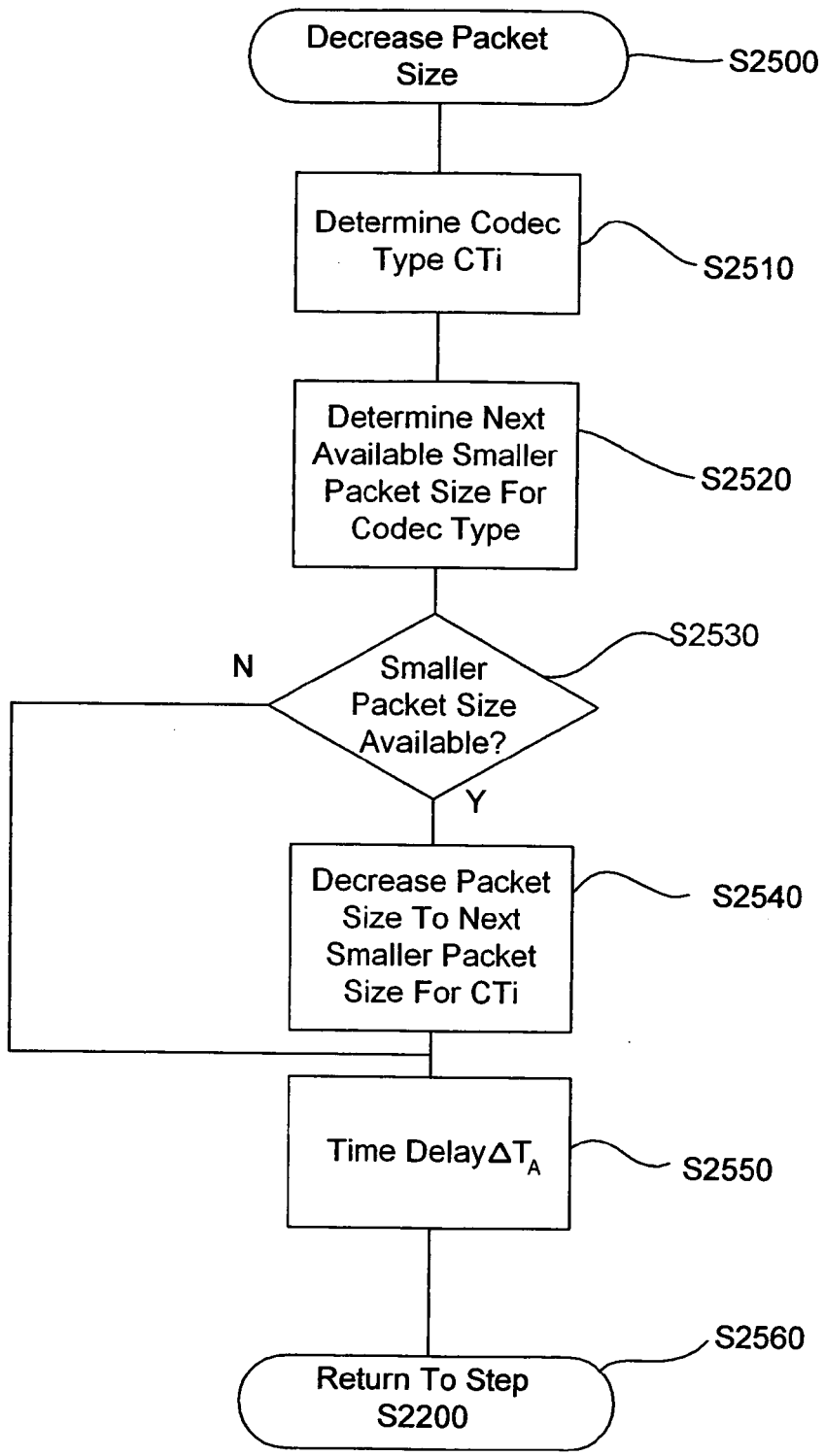
FIG. 15 illustrates an exemplary flow diagram showing in further detail the decrease packet size step of FIG. 14 in accordance with an embodiment of the system and method of the invention.

FIG. 15 is a flow chart illustrating in further detail the "decrease packet size" step S2500 of FIG. 14. As described above in conjunction with FIG. 14, the packet size is decreased when the quality of service is above the QoS_Packet_Threshold. The process of FIG. 15 starts in step S2500. Then, in step S2510, the codec type $CT_i$ is determined. Then the process passes to step S2520.

In step S2520, the next available smaller packet size for the codec type $CT_i$ is determined. Then in step S2530, a determination is made whether a next available smaller packet size is available. If yes in step S2530, i.e. a smaller packet size is available, then the process passes to step S2540. In step S2540, the packet size is decreased to the next smaller packet size for the determined codec type $CT_i$. After step S2540, the process then passes to step S2550.

Alternatively, if a smaller packet size is not available as determined in step S2530, then the process passes directly to step S2550.

In step S2550, a time delay $\Delta T_A$ occurs in accordance with the system and method of the invention. Then, the process passes to step S2560 as shown in FIG. 15. In step S2560, the process returns to step S2200 in FIG. 14.

Figure 16:
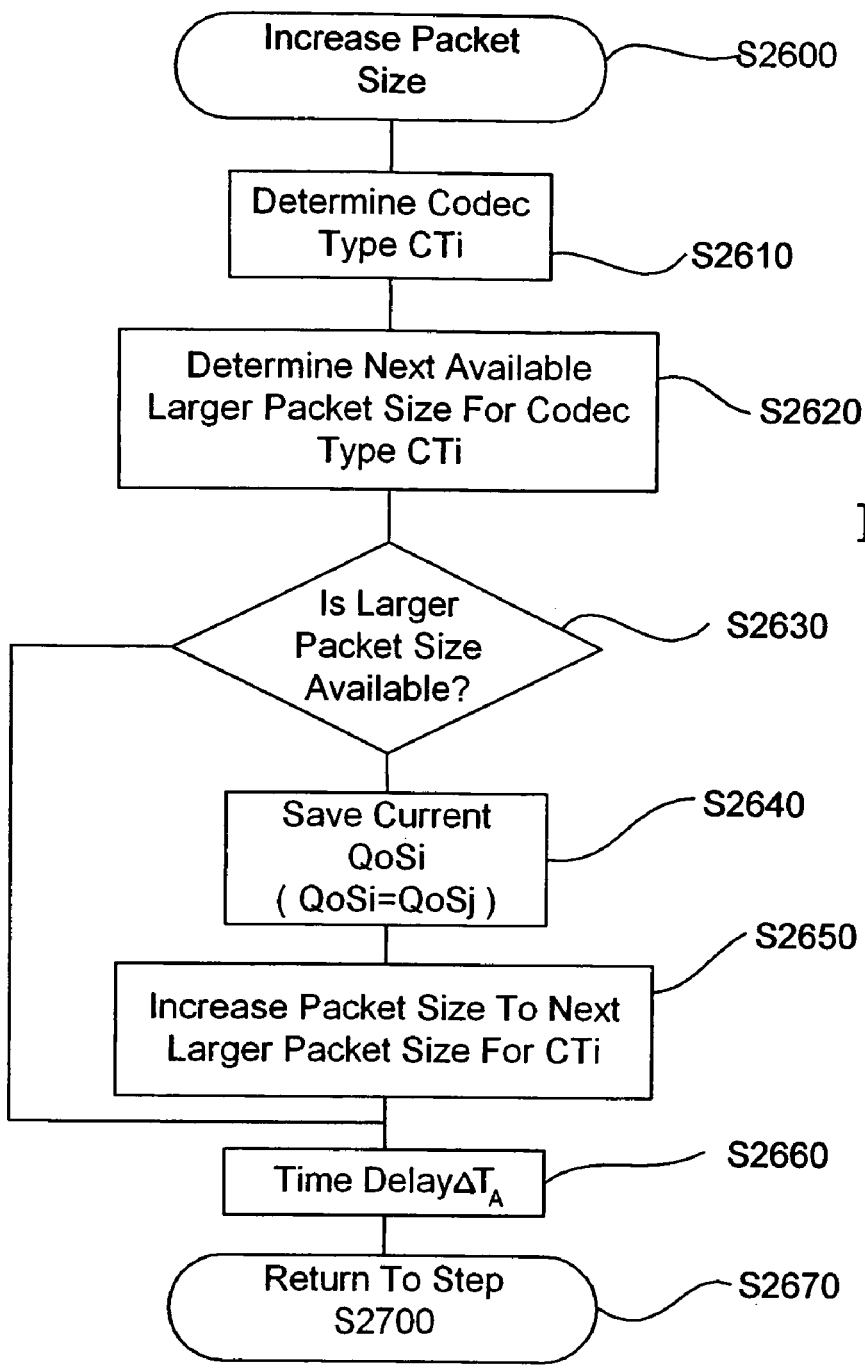
FIG. 16 illustrates an exemplary flow diagram showing in further detail the increase packet size of FIG. 14 in accordance with an embodiment of the system and method of the invention.

FIG. 16 is a flowchart illustrating in further detail the increase packet size step S2600 as shown in FIG. 14 in accordance with the system and method of the invention. As shown in FIG. 16, the increase packet size process begins in step S2600. Then, the codec type $CT_i$ is determined in step S2610.

After step S2610, the process as shown in FIG. 16 passes to step S2620. In step S2620, a determination is made whether a next available larger packet size for the codec type $CT_i$ is available. After step S2620, the process passes to step S2630. In step S2630, it is determined whether a larger packet size is available for the codec type $CT_i$.

If no, i.e., a larger packet size is not available, then it is not possible to increase the packet size. As a result, the process passes to step S2660 as shown in FIG. 16. In step S2660, the process performs a time delay $\Delta T_A$.

Alternatively, if a larger packet size is available as determined in step S2630, then in step S2640, the current $QoS_i$ is saved as $QoS_j$. That is, the quality of service is saved for later comparisons subsequent to adjustments to the packet size. After step S2640, the process then passes to step S2650. In step S2650, the packet size is increased to the next larger packet size. Then the process passes to step S2660.

As described above, in step S2660 a time delay $\Delta T_A$ is performed. After step S2660, the process passes to step S2670. In step S2670, the process returns to step S2700 as shown in FIG. 14.

Figure 17:
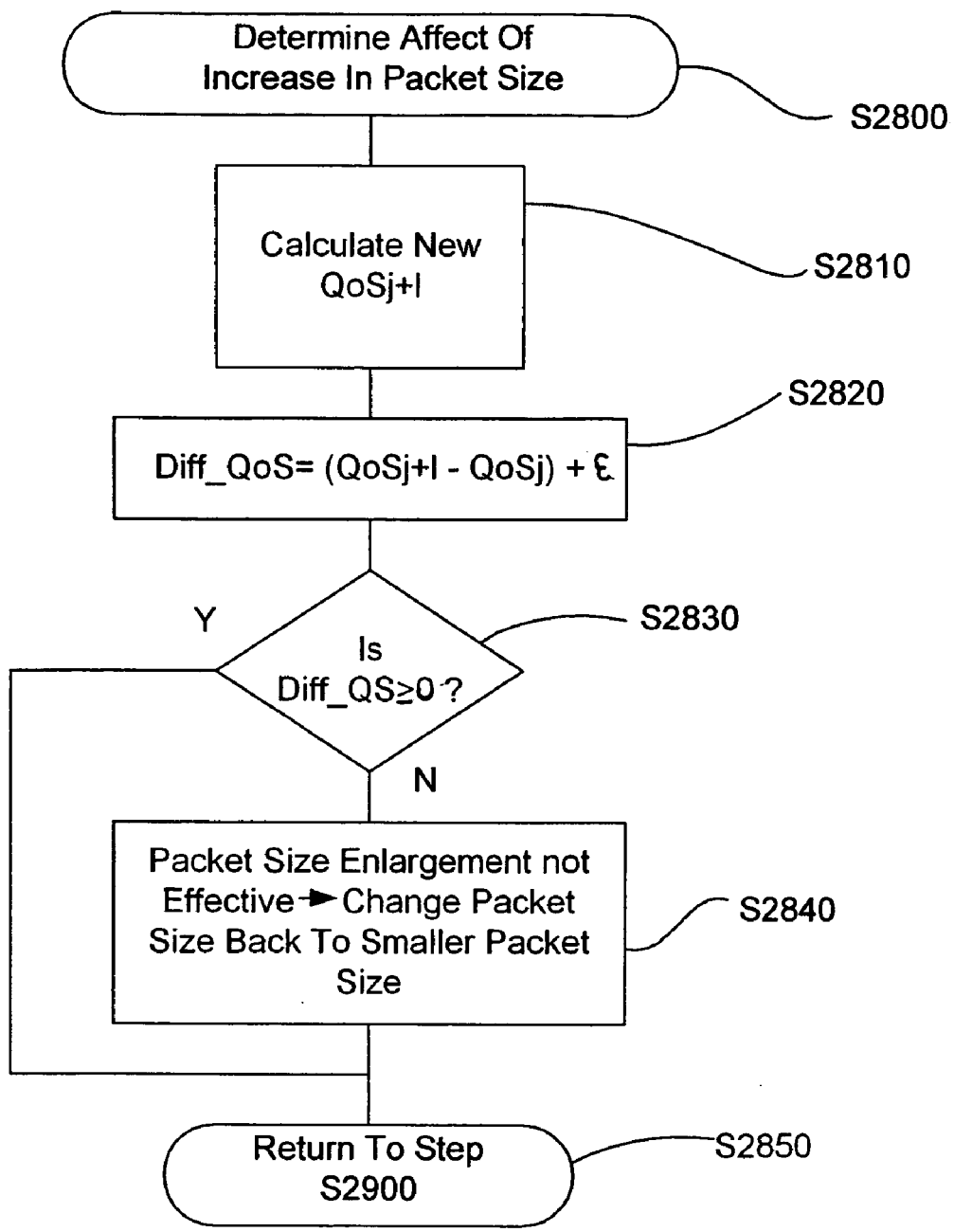
FIG. 17 illustrates an exemplary flow diagram showing in further detail the step of determine affect of increase in packet size of FIG. 14 according to an embodiment of the system and method of the invention.

FIG. 17 illustrates further aspects of the determine effect of the increase in packet size step S2800 of FIG. 14. As shown in FIG. 17, the process starts in step S2800. Then, the process passes to step S2810.

In step S2810, a new quality of service ($QoS_{j+1}$) is calculated. Then the process passes to step S2820. In step S2820, a differential QoS is determined, i.e., DIFF_QoS= $(QoS_j - QoS_{j+1}) + \epsilon$ It should be noted, as described above, that a better QoS results in a higher value of QoS, i.e., a high QoS is indicative of a high voice quality. The process then passes to step S2830.

In step S2830, it is determined whether Diff_QoS is $\geq 0$. That is, in step S2830, a determination is made whether the increased packet size is justified. If the relationship Diff_QoS is $\geq 0$ is satisfied, then the increase in packet size is justified. Accordingly, if yes, in step S2830, then the process passes to step S2850.

Alternatively, if no in step S2830, then the increase in packet size was not effective. As a result, in step S2840, the packet size is changed back to the original smaller packet size. The process then passes to step S2850.

In step S2850, the process returns to step S2900 as shown in FIG. 14.

Figure 18A:
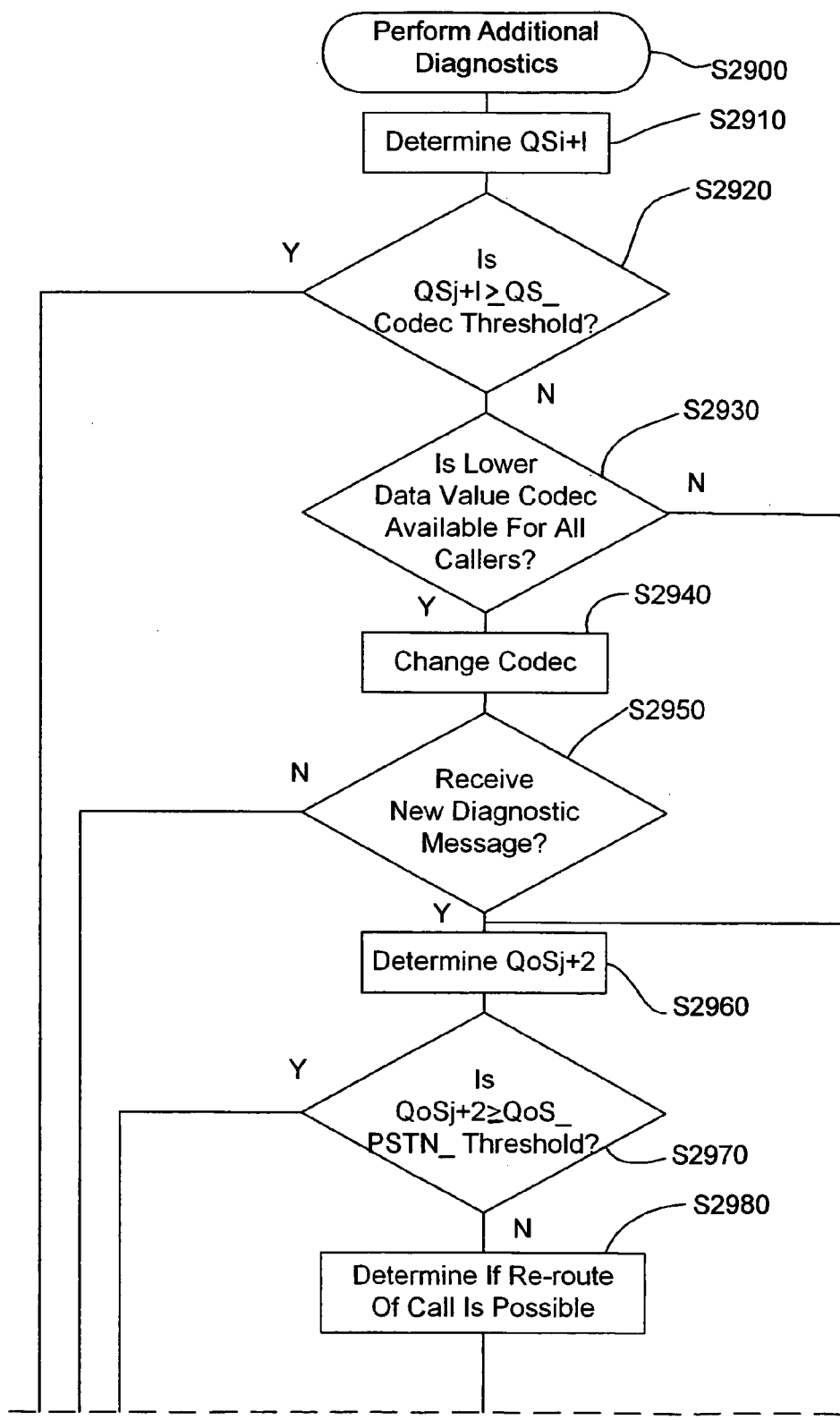
FIG. 18 illustrates an exemplary flow diagram showing in further detail the perform additional diagnostics step of FIG. 14 according to an embodiment of the system and method of the invention.
Figure 18B:
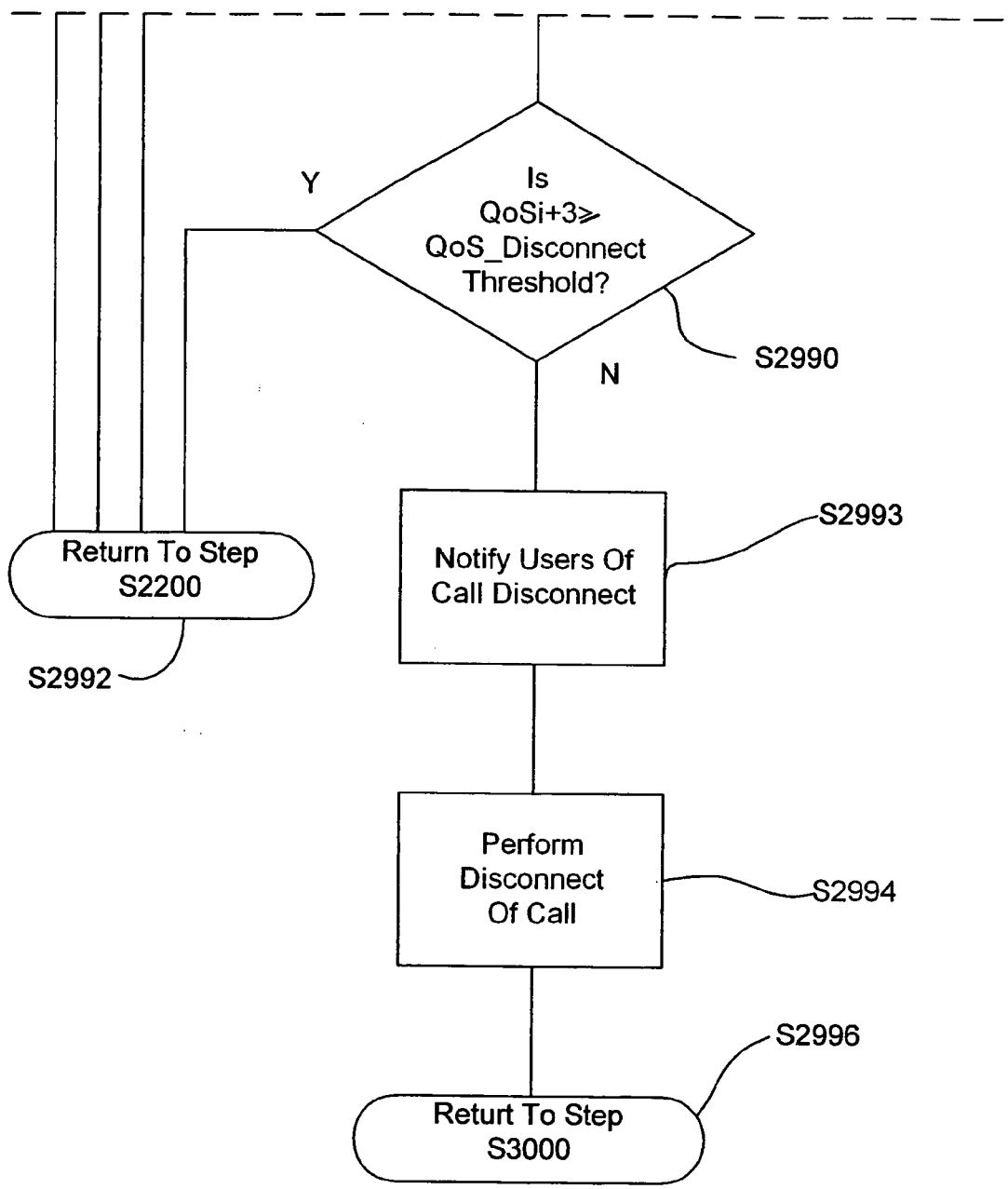

FIG. 18 is a flowchart illustrating in further detail the perform additional diagnostics step S2900 as shown in FIG. 14. As shown in FIG. 18, the process starts in step S2900. Then, the process passes to step S2910. In step S2910, the quantity $QoS_{i+1}$ is determined. Then the process passes to step S2920.

In step S2920, a determination is made whether $QoS_{i+1} \geq QoS\_Codec\_Threshold$ is satisfied. If yes, then quality of the transmission is not poor enough to justify the switch to a different codec. Accordingly, the process passes to step S2992 as shown in FIG. 18. In step S2992, the process returns to step S2200 in FIG. 14

Alternatively, if the relationship of step S2920 is not satisfied, then the process passes to step S2930. In step S2930, a determination is made whether a lower data value codec is available for all the callers. If no, then the process again passes to step S2960.

Alternatively, if a lower data value codec is available for all the callers in step S2930, then the process passes to step S2940. In step S2940, the codec is changed for all users. Then the process passes to step S2950.

In step S2950, the process waits a predetermined period of time to determine if a diagnostic message is received. If no, then the process passes to step S2992. In step S2992, the process returns to step S2200 in FIG. 14.

Alternatively, if a new diagnostic message is received in step S2950, then the process passes to step S2960. In step S2960, a further quality of service is determined ($QoS_{j+2}$). Then the process passes to step S2970. In step S2970, a determination is made whether $QoS_{j+2} \geq QoS\_PSTN\_Threshold$. If yes, in step S2970, then the process passes to step S2992.

Alternatively, if the relationship of step S2970 is not satisfied, then the process passes to step S2980. In step S2980, a determination is made if a re-route of the call is possible, as further described with respect to FIG. 20 below. After step S2980, the process passes to step S2990 if a re-route of the call is not possible.

In step S2990, a determination is made whether a further quality of service $QoS_{i+3} \geq QoS\_Disconnect\_Threshold$. If yes, then the process passes to step S2992. Alternatively, if no in step S2990, i.e., the quality of the call is poor enough to justify a disconnection of the call, then the process passes to step S2993. In step S2993, the users are notified of a pending call disconnect via a displayed message, for example.

Then, in step S2994, the disconnect of the call is performed. Then the process passes to step S2996. In step S2996, the process returns to step S3000 in FIG. 14.

Figure 19:
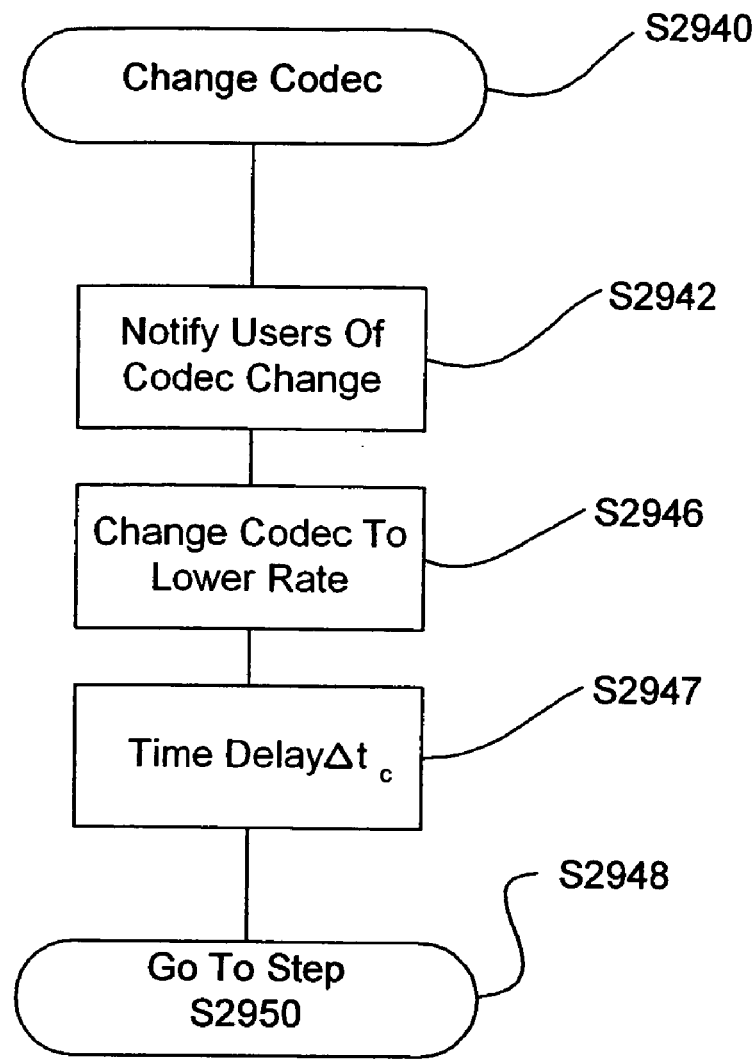
FIG. 19 illustrates an exemplary flow diagram showing in further detail the change codec step of FIG. 18 in accordance with an embodiment of the system and method of the invention.

FIG. 19 illustrates in further detail the change codec step S2940 as shown in FIG. 18. The process shown in FIG. 19 starts in step S2940. Then, the process passes to step S2942.

In step S2942, the users are notified of the codec change. Then, in step S2946, the codec is changed to a lower data rate. Then, the process passes to step S2947.

In step S2947, the process performs a time delay $\Delta T_c$. Then, the process passes to step S2948. In step S2948, the process returns to step S2950 in FIG. 18.

Figure 20:
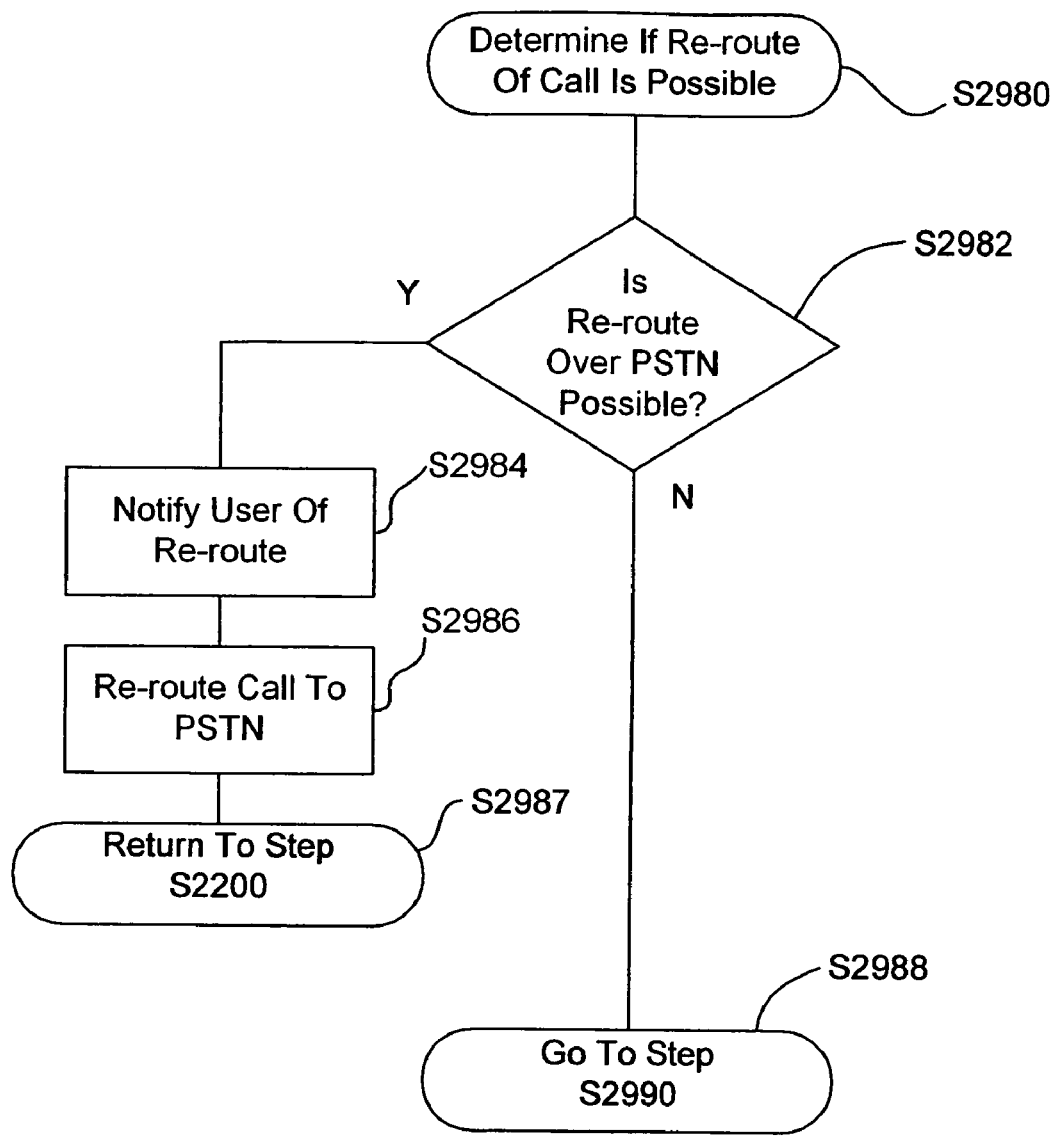
FIG. 20 illustrates an exemplary flow diagram showing in further detail the determine if re-route of call is possible step of FIG. 18 according to an embodiment of the system and method of the invention.

FIG. 20 illustrates in further detail the determine if re-route of call is possible step of FIG. 18. The process as shown in FIG. 20 starts in step S2980. Then, the process passes to step S2982.

In step S2982, a determination is made whether the re-route of the call over the PSTN is possible. If no, then the process passes to step S2988. In step S2988, the process returns to step S2990 in FIG. 18.

Alternatively, if the re-route of the call over the PSTN is possible as determined in step S2982, then the process passes to step S2984. In step S2984, the users are notified of the re-route. Then the process passes to step S2986. In step S2986, the re-route of the call is performed over the PSTN. Then, in step S2987, the process returns to step S2200 in FIG. 14.

It should be recognized that the processes illustrated in FIGS. 14–20 may be implemented on any of a wide variety of computers or operating systems, including but not limited to the operating system as shown in FIGS. 1–8.

III. Hardware and Software Implementations

The various managers, controllers and generators of the present invention can perform specific features, which in effect comprise a computer system or portions thereof. Such a computer system includes, for example, one or more processors that are connected to a communication bus. Although telephony-specific hardware can be used to implement the present invention, the following description of a general purpose computer system is provided for completeness.

The computer system can also include main memory and can also include secondary memory. The secondary memory can include, for example, a hard disk drive and/or a removable storage drive, representing a floppy disk drive, a magnetic tape drive, an optical disk drive, and the like. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface to remote storage and the like. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Examples of communications interfaces include, but are not limited to a modem, a network interface (such as an Ethernet card), a communications port, a PCM-CIA slot and card, etc. Software and data transferred via the communications interface are in the form of signals which can be electronic, electromagnetic, optical or other signals capable of being received by the communications interface. These signals are provided to communications interface via a channel that can be implemented using wire or cable, fiber optics, a phone line, a cellular phone link, an RF link, and the like.

In this document, the terms "computer program medium" and "computer usable medium" are used to generally refer to media such as a removable storage device, and a hard disk drive. Computer programs are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. In particular, the computer programs, when executed, enable the processor to perform features of the present invention. Accordingly, such computer programs represent controllers of the computer system.

In an embodiment where the invention is implemented using software, the software can be stored in a computer program and loaded into the computer system using the removable storage drive, the hard drive or the communications interface. The control logic (software), when executed by the processor, causes the processor to perform certain functions of the invention as described herein.

In another embodiment, features of the invention are implemented primarily in hardware using, for example, hardware components such as application specific integrated circuits (ASICs) and the like. Implementation of the hardware state machine so as to perform the functions described herein will be apparent to persons skilled in the relevant art.

In yet another embodiment, features of the invention can be implemented using a combination of both hardware and software.

IV. Conclusion

It will therefore be readily understood by those persons skilled in the art that the present invention is susceptible to a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention.

Accordingly, while the present invention has been described herein in detail in relation to its exemplary embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims.

What is claimed is:

1. A method for managing performance information for a communication between communication system terminal endpoints (TEs) communicating over an Internet Protocol (IP) network, comprising the steps of:

transmitting a Diagnostic Configuration Message (DCM) from a Diagnostic Supervisor (DS) to at least one TE, wherein the DS is capable of being coupled to the at least one TE;

generating Diagnostic Messages (DMs) at the at least one TE based on diagnostic information concerning IP network transmissions in which the at least one TE participates, the DCM instructing the at least one TE how to format and under what criteria to transmit the DMs;

transmitting the DMs from the at least one TE to at least one DS; and calculating a value for a quality of service of the communication based on the DMs;

wherein the quality of service is based on communication parameters including at least one of a number of collisions, jitter, amount of lost packets and amount of network usage; and wherein the quality of service is further based on weighting the communication parameters, the weighting based on an importance associated with each communication parameter and wherein the method further includes selectively adjusting one of a plurality of different transmission parameters of each TE via a real time response manager, the adjustments including adjustments to route, parameter thresholds and packet size and wherein the adjustment is made based on the calculated quality of service.

2. The method according to claim 1, the method further comprising the step of rerouting an IP network connection between two or more TEs to the public switched telephone network (PSTN) based on the calculated value of the quality of service relative to a threshold value.

3. The method according to claim 1, the method further comprising the step of determining whether to terminate a communication based on the calculated value of the quality of service relative to a threshold value.

4. The method according to claim 1, wherein the communication is voice, modem, facsimile, video or data transmissions.

5. A method for managing performance information for a communication between communication system terminal endpoints (TEs) communicating over an Internet Protocol (IP) network, comprising the steps of:

transmitting a Diagnostic Configuration Message (DCM) from a Diagnostic Supervisor (DS) to at least one TE, wherein the DS is capable of being coupled to the at least one TE;

generating Diagnostic Messages (DMs) at the at least one TE based on diagnostic information concerning IP network transmissions in which the at least one TE participates, the DCM instructing the at least one TE how to format and under what criteria to transmit the DMs;

transmitting the DMs from the at least one TE to at least one DS; and calculating a value for the quality of service of the communication based on the DMs;

wherein the communication is transmitted using a plurality of packets each possessing a packet size, the method further comprising the step of determining whether to change the packet size based on the determined value of the quality of service relative to a threshold value QoS_Packet_Threshhold.

6. The method according to claim 5, the method further comprising the step of decreasing the packet size if the value of the quality of service is better than the QoS_Packet_Threshhold.

7. The method according to claim 5, the method further comprising the step of increasing an original packet size if the value of the quality of service is poorer than the QoS_Packet_Threshhold.

8. The method according to claim 7, the method further comprising the steps of:
   determining if increasing the packet size improved the quality of service; and
   if the quality of service is improved, then maintaining the increased packet size.

9. The method according to claim 7, the method further comprising the steps of:
   determining if increasing the packet size improved the quality of service; and
   if the quality of service is not improved, then returning the increased packet size to the original packet size.

10. A method for managing performance information for a communication between communication system terminal endpoints (TEs) communicating over an Internet Protocol (IP) network, comprising the steps of:
    transmitting a Diagnostic Configuration Message (DCM) from a Diagnostic Supervisor (DS) to at least one TE, wherein the DS is capable of being coupled to the at least one TE;
    generating Diagnostic Messages (DMs) at the at least one TE based on diagnostic information concerning IP network transmissions in which the at least one TE participates, the DCM instructing the at least one TE how to format and under what criteria to transmit the DMs;
    transmitting the DMs from the at least one TE to at least one DS; and
    calculating a value for the quality of service of the communication based on the DMs;
    wherein communications between TEs are performed using at least one codec, the method further comprising the step of determining whether to change the codec so as to use a different codec based on the calculated value of the quality of service relative to a threshold value QoS_Codec_Threshold.

11. The method according to claim 10, wherein the step of determining whether to change the codec includes the steps of:
    determining if the quality of service is less than QoS_Codec_Threshold;
    if the quality of service is less than QoS_Codec_Threshold, then determining if there is a lower data value codec available for all callers in the transmission;
    if there is a lower data value codec available for all callers in the transmission, then changing the codec from an original data value to the lower data value.

12. The method of claim 11, further comprising the steps of:
    determining if changing the codec to the lower data value improved the quality of service; and
    if the quality of service is not improved, then returning the codec data value to the original data value.

* * * * *

UNITED STATES PATENT AND TRADEMARK OFFICE
CERTIFICATE OF CORRECTION

| | | |
|---|---|---|
| PATENT NO. | : 7,120,122 B1 | Page 1 of 1 |
| APPLICATION NO. | : 09/658330 | |
| DATED | : October 10, 2006 | |
| INVENTOR(S) | : Michael A. Starr and Charles J. Gross | |

It is certified that error appears in the above-identified patent and that said Letters Patent is hereby corrected as shown below:

Column 10, line 39 should read -- that lists the name of each information field used in the IE.--

Column 26, line 55, -- $+\beta_j (\xi_4 COL_j + \xi_5 PNU_j + \xi_6 JIT_j + \xi_7 PLP_j) + CONST \rangle^{-1}$; --

Signed and Sealed this

Sixth Day of March, 2007

JON W. DUDAS
*Director of the United States Patent and Trademark Office*